(12) United States Patent
Jinka et al.

(10) Patent No.: US 12,420,221 B2
(45) Date of Patent: Sep. 23, 2025

(54) MULTI-LAYERED ELECTRET-CONTAINING FILTRATION MEDIA

(71) Applicant: Hollingsworth & Vose Company, East Walpole, MA (US)

(72) Inventors: Sudheer Jinka, Christiansburg, VA (US); David T. Healey, Bellingham, MA (US); Mark A. Gallimore, Floyd, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 15/217,718

(22) Filed: Jul. 22, 2016

(65) Prior Publication Data
US 2018/0001247 A1 Jan. 4, 2018

Related U.S. Application Data

(63) Continuation-in-part of application No. 15/200,612, filed on Jul. 1, 2016, now abandoned.

(51) Int. Cl.
*B01D 39/16* (2006.01)

(52) U.S. Cl.
CPC .. *B01D 39/1623* (2013.01); *B01D 2239/0435* (2013.01); *B01D 2239/0659* (2013.01); *B01D 2239/1258* (2013.01); *B01D 2275/10* (2013.01)

(58) Field of Classification Search
CPC ............... B01D 46/32; B01D 39/1623; B01D 2239/435; B01D 2239/659;
(Continued)

(56) References Cited

U.S. PATENT DOCUMENTS

| 853,981 A | 5/1907 | Kneuper |
| 2,196,821 A | 4/1940 | Arnold |

(Continued)

FOREIGN PATENT DOCUMENTS

| DE | 3341486 A1 | 5/1985 |
| DE | 19854565 A1 | 5/2000 |

(Continued)

OTHER PUBLICATIONS

"Acrylic fiber" Wikipedia published Jun. 5, 2015 (Year: 2015).*
(Continued)

*Primary Examiner* — Stephen Hobson
(74) *Attorney, Agent, or Firm* — Wolf, Greenfield & Sacks, P.C.

(57) ABSTRACT

Filter media for filtering gas streams (e.g., air) are described herein. In some embodiments, the filter media may be designed to have desirable properties such as stable filtration efficiency, high oil repellency, low instantaneous resistance, and/or stable service life. In certain embodiments, one or more layers of the media may have a certain value of basis weight over air permeability (and/or a ratio of a value of basis weight over air permeability between two layers). The filter media may optionally comprise a support layer with a relatively high air permeability (e.g., greater than or equal to 1100 CFM). In some cases, the filter media may have a relatively low initial resistance and/or may have a particular final E1 efficiency. The filter media described herein may be particularly well-suited for applications that involve filtering gas streams (e.g., face masks, cabin air filtration, vacuum filtration, respirator equipment, as well as residential heating ventilation and air conditioning (HVAC) and industrial HVAC systems), though the media may also be used in other applications.

21 Claims, 7 Drawing Sheets

(58) Field of Classification Search
CPC ........ B01D 2239/1258; B01D 2275/10; B01D 2239/0435; B01D 2239/0659
See application file for complete search history.

(56) References Cited

U.S. PATENT DOCUMENTS

| | | | |
|---|---|---|---|
| 2,208,443 A * | 7/1940 | Ashley | F24F 3/14 62/99 |
| 2,235,005 A * | 3/1941 | Ashley | F24F 3/1411 236/44 C |
| 2,392,901 A | 1/1946 | Brown | |
| 2,663,156 A * | 12/1953 | Baker | F24F 3/14 62/155 |
| 2,928,765 A | 3/1960 | Kurjan et al. | |
| 3,353,800 A * | 11/1967 | Jens | B01D 45/08 261/3 |
| 3,654,851 A * | 4/1972 | Bertin | F24F 13/1486 454/319 |
| 3,656,882 A | 4/1972 | Riggs | |
| 3,855,133 A | 12/1974 | Roehsler | |
| 3,908,528 A * | 9/1975 | Bertin | F24F 13/08 49/74.1 |
| 3,944,686 A | 3/1976 | Froberg | |
| 4,033,881 A | 7/1977 | Pall | |
| 4,048,953 A | 9/1977 | Froberg | |
| 4,483,771 A | 11/1984 | Koch et al. | |
| 4,572,428 A * | 2/1986 | Groff | F24F 11/62 236/44 A |
| 4,759,989 A | 7/1988 | Abe et al. | |
| 4,765,812 A | 8/1988 | Homonoff et al. | |
| 4,851,304 A | 7/1989 | Miwa et al. | |
| 4,913,856 A * | 4/1990 | Morton | B01F 23/12 261/DIG. 15 |
| 4,925,601 A | 5/1990 | Vogt et al. | |
| 4,980,099 A * | 12/1990 | Myers | B01F 25/313 261/116 |
| 5,021,284 A | 6/1991 | Miwa et al. | |
| 5,108,827 A | 4/1992 | Gessner | |
| 5,167,765 A | 12/1992 | Nielsen et al. | |
| 5,178,931 A | 1/1993 | Perkins et al. | |
| 5,238,474 A | 8/1993 | Kahlbaugh et al. | |
| 5,306,321 A | 4/1994 | Osendorf | |
| 5,349,829 A * | 9/1994 | Tsimerman | F24F 5/0035 261/153 |
| 5,380,088 A * | 1/1995 | Fleischli | B01F 25/3131 366/337 |
| 5,401,446 A | 3/1995 | Tsai et al. | |
| 5,496,507 A | 3/1996 | Angadjivand et al. | |
| 5,516,466 A * | 5/1996 | Schlesch | F24F 6/18 261/DIG. 76 |
| 5,571,604 A | 11/1996 | Sprang et al. | |
| 5,580,459 A | 12/1996 | Powers et al. | |
| 5,620,785 A | 4/1997 | Watt et al. | |
| 5,647,881 A | 7/1997 | Zhang et al. | |
| 5,648,027 A | 7/1997 | Tajiri et al. | |
| 5,653,919 A * | 8/1997 | White | B01F 23/213 261/21 |
| 5,672,188 A | 9/1997 | Choi | |
| 5,672,399 A | 9/1997 | Kahlbaugh et al. | |
| 5,783,503 A | 7/1998 | Gillespie et al. | |
| 5,785,725 A | 7/1998 | Cusick et al. | |
| 5,908,598 A | 6/1999 | Rousseau et al. | |
| 5,919,847 A | 7/1999 | Rousseau et al. | |
| 5,935,883 A | 8/1999 | Pike | |
| 5,942,163 A * | 8/1999 | Robinson | F24F 6/18 261/118 |
| 5,952,251 A | 9/1999 | Jackson et al. | |
| 5,955,174 A | 9/1999 | Wadsworth et al. | |
| 5,968,635 A | 10/1999 | Rousseau et al. | |
| 5,976,208 A | 11/1999 | Rousseau et al. | |
| 5,979,030 A | 11/1999 | Legare | |
| 5,993,501 A | 11/1999 | Cusick et al. | |
| 6,002,017 A | 12/1999 | Rousseau et al. | |
| 6,006,538 A * | 12/1999 | Prueitt | F28C 3/08 62/331 |
| 6,059,866 A * | 5/2000 | Yamagata | B01D 53/78 96/265 |
| 6,123,752 A | 9/2000 | Wu et al. | |
| 6,171,369 B1 | 1/2001 | Schultink et al. | |
| 6,171,684 B1 | 1/2001 | Kahlbaugh et al. | |
| 6,183,536 B1 | 2/2001 | Schultink et al. | |
| 6,193,773 B1 | 2/2001 | Schlor et al. | |
| 6,211,100 B1 | 4/2001 | Legare | |
| 6,213,122 B1 | 4/2001 | Rousseau et al. | |
| 6,214,094 B1 | 4/2001 | Rousseau et al. | |
| 6,238,466 B1 | 5/2001 | Rousseau et al. | |
| 6,251,224 B1 | 6/2001 | Dong | |
| 6,261,342 B1 | 7/2001 | Rousseau et al. | |
| 6,261,979 B1 | 7/2001 | Tanaka et al. | |
| 6,267,252 B1 | 7/2001 | Amsler | |
| 6,268,495 B1 | 7/2001 | Rousseau et al. | |
| 6,372,004 B1 | 4/2002 | Schultink et al. | |
| 6,387,165 B1 * | 5/2002 | Wakamatsu | B01D 47/06 96/322 |
| 6,397,458 B1 | 6/2002 | Jones et al. | |
| 6,398,847 B1 | 6/2002 | Jones et al. | |
| 6,409,806 B1 | 6/2002 | Jones et al. | |
| 6,428,610 B1 | 8/2002 | Tsai et al. | |
| 6,432,175 B1 | 8/2002 | Jones et al. | |
| 6,488,219 B1 * | 12/2002 | Herr | F24F 6/18 239/602 |
| 6,489,051 B1 | 12/2002 | Inoue | |
| 6,554,881 B1 | 4/2003 | Healey | |
| 6,562,112 B2 | 5/2003 | Jones et al. | |
| 6,579,350 B2 | 6/2003 | Doherty | |
| 6,623,548 B2 | 9/2003 | Gordon et al. | |
| 6,627,563 B1 | 9/2003 | Huberty | |
| 6,660,210 B2 | 12/2003 | Jones et al. | |
| 6,706,086 B2 | 3/2004 | Emig et al. | |
| 6,713,034 B2 | 3/2004 | Nakamura et al. | |
| 6,743,273 B2 | 6/2004 | Chung et al. | |
| 6,746,517 B2 | 6/2004 | Benson et al. | |
| 6,808,551 B2 | 10/2004 | Jones et al. | |
| 6,858,057 B2 | 2/2005 | Healey | |
| 6,872,311 B2 | 3/2005 | Koslow | |
| 6,924,028 B2 | 8/2005 | Chung et al. | |
| 6,936,554 B1 | 8/2005 | Singer et al. | |
| 6,953,544 B2 | 10/2005 | Jones et al. | |
| 6,955,775 B2 | 10/2005 | Chung et al. | |
| 6,977,111 B2 | 12/2005 | Yamaguchi et al. | |
| 6,986,804 B2 | 1/2006 | Dominiak et al. | |
| 7,008,465 B2 | 3/2006 | Graham et al. | |
| 7,070,640 B2 | 7/2006 | Chung et al. | |
| 7,137,510 B1 | 11/2006 | Klein et al. | |
| 7,144,533 B2 | 12/2006 | Koslow | |
| 7,179,317 B2 | 2/2007 | Chung et al. | |
| 7,235,122 B2 | 6/2007 | Bryner et al. | |
| 7,244,291 B2 | 7/2007 | Spartz et al. | |
| 7,244,292 B2 | 7/2007 | Kirk et al. | |
| 7,278,542 B2 | 10/2007 | Dussaud et al. | |
| 7,314,497 B2 | 1/2008 | Kahlbaugh et al. | |
| 7,316,723 B2 | 1/2008 | Chung et al. | |
| 7,318,852 B2 | 1/2008 | Chung et al. | |
| 7,390,760 B1 | 6/2008 | Chen et al. | |
| 7,578,938 B2 | 8/2009 | Rokman et al. | |
| 7,887,889 B2 | 2/2011 | David et al. | |
| 8,128,069 B2 * | 3/2012 | Reens | F24F 6/12 261/78.2 |
| 8,608,817 B2 | 12/2013 | Wertz et al. | |
| 8,679,217 B2 | 3/2014 | Chi et al. | |
| 8,679,218 B2 * | 3/2014 | Wertz | B01D 39/163 442/381 |
| 8,950,587 B2 | 2/2015 | Thomson et al. | |
| 8,973,906 B2 * | 3/2015 | Klingenburg | F24F 3/14 261/95 |
| 8,986,432 B2 | 3/2015 | Wertz et al. | |
| 9,127,363 B2 | 9/2015 | David et al. | |
| 9,283,501 B2 | 3/2016 | Wertz et al. | |
| 9,289,632 B2 | 3/2016 | Takeuchi et al. | |
| 2001/0032714 A1 * | 10/2001 | Haglid | F24F 5/0035 62/271 |

(56) References Cited

U.S. PATENT DOCUMENTS

| | | |
|---|---|---|
| 2001/0042361 A1 | 11/2001 | Cox et al. |
| 2002/0013112 A1 | 1/2002 | Bontaites et al. |
| 2002/0083837 A1 | 7/2002 | Doherty |
| 2003/0082979 A1 | 5/2003 | Bean et al. |
| 2003/0106294 A1 | 6/2003 | Chung et al. |
| 2003/0168401 A1 | 9/2003 | Koslow |
| 2003/0177909 A1 | 9/2003 | Koslow |
| 2003/0196963 A1 | 10/2003 | Koslow |
| 2003/0196964 A1 | 10/2003 | Koslow |
| 2003/0201231 A1 | 10/2003 | Koslow |
| 2003/0203696 A1 | 10/2003 | Healey |
| 2003/0205529 A1 | 11/2003 | Koslow |
| 2003/0205530 A1 | 11/2003 | Koslow |
| 2003/0205531 A1 | 11/2003 | Koslow |
| 2003/0211799 A1 | 11/2003 | Yao et al. |
| 2003/0213750 A1 | 11/2003 | Koslow |
| 2003/0226792 A1 | 12/2003 | Tumbrink et al. |
| 2004/0038014 A1 | 2/2004 | Schaefer et al. |
| 2004/0060268 A1 | 4/2004 | Chung et al. |
| 2004/0060269 A1 | 4/2004 | Chung et al. |
| 2004/0083695 A1 | 5/2004 | Schultink et al. |
| 2004/0112023 A1 | 6/2004 | Choi |
| 2004/0123572 A1 | 7/2004 | Chung et al. |
| 2004/0163540 A1 | 8/2004 | Mori et al. |
| 2004/0187454 A1 | 9/2004 | Chung et al. |
| 2004/0211160 A1 | 10/2004 | Rammig et al. |
| 2004/0255783 A1 | 12/2004 | Graham et al. |
| 2005/0056313 A1* | 3/2005 | Hagen .......... B01F 25/3132 137/3 |
| 2005/0079379 A1 | 4/2005 | Wadsworth et al. |
| 2005/0109393 A1 | 5/2005 | Anderson |
| 2005/0109554 A1 | 5/2005 | Ishikawa et al. |
| 2005/0109557 A1 | 5/2005 | Dravet et al. |
| 2005/0136292 A1 | 6/2005 | Mariani et al. |
| 2005/0183405 A1 | 8/2005 | Gillingham et al. |
| 2005/0193696 A1 | 9/2005 | Muller et al. |
| 2005/0210844 A1 | 9/2005 | Kahlbaugh et al. |
| 2005/0212152 A1* | 9/2005 | Reens .......... F24F 6/12 261/118 |
| 2005/0240517 A1 | 10/2005 | Wolzenski et al. |
| 2005/0241598 A1 | 11/2005 | Ezaki |
| 2005/0250726 A1 | 11/2005 | Krieg et al. |
| 2006/0096260 A1 | 5/2006 | Bryner et al. |
| 2006/0117728 A1 | 6/2006 | Dolan et al. |
| 2006/0137317 A1 | 6/2006 | Bryner et al. |
| 2006/0137318 A1 | 6/2006 | Lim et al. |
| 2006/0272303 A1 | 12/2006 | Fujiwara et al. |
| 2006/0277877 A1 | 12/2006 | Shields |
| 2006/0292947 A1 | 12/2006 | Vietes et al. |
| 2007/0054579 A1 | 3/2007 | Baker et al. |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0125700 A1 | 6/2007 | Ding et al. |
| 2007/0175192 A1 | 8/2007 | Niakan et al. |
| 2007/0175195 A1 | 8/2007 | Skirius et al. |
| 2007/0180997 A1 | 8/2007 | Leir et al. |
| 2007/0190319 A1 | 8/2007 | Kalayci |
| 2007/0232175 A1 | 10/2007 | Katayama et al. |
| 2007/0264520 A1 | 11/2007 | Wood et al. |
| 2007/0271883 A1 | 11/2007 | Chung et al. |
| 2007/0283808 A1 | 12/2007 | Chung et al. |
| 2008/0017038 A1 | 1/2008 | Wu |
| 2008/0026661 A1 | 1/2008 | Fox et al. |
| 2008/0032110 A1 | 2/2008 | Wood et al. |
| 2008/0060328 A1 | 3/2008 | Devine |
| 2008/0069991 A1 | 3/2008 | Kohli et al. |
| 2008/0105626 A1 | 5/2008 | Jones et al. |
| 2008/0108265 A1 | 5/2008 | Pourdeyhimi et al. |
| 2008/0110822 A1 | 5/2008 | Chung et al. |
| 2008/0134652 A1 | 6/2008 | Lim et al. |
| 2008/0160856 A1 | 7/2008 | Chen et al. |
| 2008/0202078 A1 | 8/2008 | Healey et al. |
| 2008/0245037 A1 | 10/2008 | Rogers et al. |
| 2008/0302242 A1 | 12/2008 | Schelling et al. |
| 2009/0044702 A1 | 2/2009 | Adamek et al. |
| 2009/0120048 A1 | 5/2009 | Wertz et al. |
| 2009/0120868 A1 | 5/2009 | Huppchen et al. |
| 2010/0000411 A1 | 1/2010 | Wertz et al. |
| 2010/0116138 A1 | 5/2010 | Guimond et al. |
| 2010/0187171 A1 | 7/2010 | Gupta |
| 2010/0187712 A1 | 7/2010 | Gupta et al. |
| 2011/0147320 A1* | 6/2011 | Sealey .......... B01D 39/06 55/528 |
| 2011/0147976 A1 | 6/2011 | Wertz et al. |
| 2012/0152821 A1 | 6/2012 | Cox et al. |
| 2012/0152824 A1 | 6/2012 | Cox et al. |
| 2012/0318754 A1 | 12/2012 | Cox et al. |
| 2014/0130469 A1 | 5/2014 | Nagy et al. |
| 2014/0214340 A1* | 7/2014 | Pfatschbacher ........ G01N 27/82 702/38 |
| 2014/0346107 A1 | 11/2014 | Anantharamaiah et al. |
| 2015/0121823 A1* | 5/2015 | Healey ............ B01D 39/202 55/521 |
| 2015/0167249 A1 | 6/2015 | Ono et al. |
| 2015/0182885 A1 | 7/2015 | Thomson et al. |
| 2016/0059167 A1 | 3/2016 | Nagy et al. |
| 2016/0158677 A1 | 6/2016 | Cox et al. |
| 2016/0166953 A1 | 6/2016 | Swaminathan et al. |
| 2016/0175752 A1 | 6/2016 | Jaganathan et al. |
| 2016/0184751 A1 | 6/2016 | Wertz et al. |
| 2016/0361674 A1 | 12/2016 | Swaminathan et al. |
| 2017/0248334 A1* | 8/2017 | Reisinger ............ F24F 6/14 |
| 2018/0001244 A1 | 1/2018 | Zhu et al. |
| 2018/0023824 A1* | 1/2018 | Reisinger ............. B05B 7/0075 239/424.5 |
| 2018/0236384 A1 | 8/2018 | Smith |
| 2018/0236385 A1 | 8/2018 | Jinka et al. |
| 2018/0236389 A1 | 8/2018 | Jinka et al. |
| 2018/0243674 A1 | 8/2018 | Gulrez et al. |
| 2022/0381455 A1* | 12/2022 | Guo ............ F24F 5/0035 |

FOREIGN PATENT DOCUMENTS

| | | |
|---|---|---|
| DE | 19922326 B4 | 2/2004 |
| DE | 10 2005 055 607 B3 | 3/2007 |
| DE | 20 2005 019 004 U1 | 4/2007 |
| DE | 10 2005 059 214 A1 | 6/2007 |
| DE | 10 2005 059 214 B4 | 10/2007 |
| DE | 10 2006 017 553 B3 | 12/2007 |
| DE | 20 2007 015 994 U1 | 1/2008 |
| EP | 0 109 282 A2 | 5/1984 |
| EP | 0 537 140 B1 | 10/1994 |
| EP | 0 847 784 A1 | 6/1998 |
| EP | 0 847 785 A1 | 6/1998 |
| EP | 0 847 786 A1 | 6/1998 |
| EP | 1 048 335 A1 | 11/2000 |
| EP | 0 719 172 B1 | 4/2002 |
| EP | 0 793 990 B1 | 3/2003 |
| EP | 1 048 335 B1 | 4/2005 |
| EP | 1 721 555 A1 | 11/2006 |
| EP | 1 775 006 A1 | 4/2007 |
| EP | 1 795 248 A2 | 6/2007 |
| EP | 1 483 039 B1 | 4/2008 |
| FR | 2828114 A1 | 2/2003 |
| GB | 1526448 A | 9/1978 |
| JP | 10-230114 A | 9/1998 |
| JP | 2008-095266 A | 4/2008 |
| WO | WO 00/02006 A2 | 1/2000 |
| WO | WO 01/98574 A2 | 12/2001 |
| WO | WO 02/20668 A2 | 3/2002 |
| WO | WO 03/064006 A1 | 8/2003 |
| WO | WO 03/064013 A1 | 8/2003 |
| WO | WO 2004/028662 A2 | 4/2004 |
| WO | WO 2004/033069 A2 | 4/2004 |
| WO | WO 2004/069378 A2 | 8/2004 |
| WO | WO 2004/112937 A1 | 12/2004 |
| WO | WO 2004/112956 A1 | 12/2004 |
| WO | WO 2005/034659 A2 | 4/2005 |
| WO | WO 2006/030407 A1 | 3/2006 |
| WO | WO 2006/049664 A1 | 5/2006 |
| WO | WO 2006/053295 A1 | 5/2006 |
| WO | WO 2006/071979 A1 | 7/2006 |

(56) References Cited

FOREIGN PATENT DOCUMENTS

| | | |
|---|---|---|
| WO | WO 2006/071980 A1 | 7/2006 |
| WO | WO 2006/096180 A1 | 9/2006 |
| WO | WO 2006/112563 A2 | 10/2006 |
| WO | WO 2007/024445 A1 | 3/2007 |
| WO | WO 2007/041310 A2 | 4/2007 |
| WO | WO 2007/041311 A2 | 4/2007 |
| WO | WO 2007/068302 A1 | 6/2007 |
| WO | WO 2007/068408 A1 | 6/2007 |
| WO | WO 2007/068444 A1 | 6/2007 |
| WO | WO 2007/076015 A2 | 7/2007 |
| WO | WO 2007/112443 A2 | 10/2007 |
| WO | WO 2008/011450 A1 | 1/2008 |
| WO | WO 2008/016771 A1 | 2/2008 |
| WO | WO 2008/052970 A1 | 5/2008 |
| WO | WO 2008/057397 A1 | 5/2008 |
| WO | WO 2008/057431 A2 | 5/2008 |
| WO | WO 2008/066813 A2 | 6/2008 |
| WO | WO 2008/103821 A2 | 8/2008 |
| WO | WO 2008/150548 A2 | 12/2008 |

OTHER PUBLICATIONS

"Relative Permittivity—Dielectric Constant" The Engineering Toolbox published Jul. 2, 2014 accessed at <https://web.archive.org/web/20140702232754/https://www.engineeringtoolbox.com/relative-permittivity-d_1660.html> (Year: 2014).*

International Search Report and Written Opinion for PCT/US17/40287 mailed Sep. 15, 2017.

International Search Report and Written Opinion for PCT/US17/43249 mailed Oct. 10, 2017.

Deka et al., Gradient density media for liquid filtration. Filtration News. 2004;22(4):24, 26, 28, 30, 32 and 33.

Kaukopaasi et al., Multilayered sheets: the media of the future for automotive filtration applications? TAPPI Journal. 1992;75(1):127-32.

Kaukopaasi et al., Multi-layered sheet—the future media for automotive filtration applications? Nonwoven Conference. TAPPI Proceedings. 1991;137-154.

Lloyd et al., Layer mixing during three-layer stratified forming: the role of vane length and mix-wire speed difference. TAPPI Journal. Nov. 1998;81(11):194-202.

Montefusco et al., The use of nonwovens in air filtration. Filtration and Separation. 2005;42(2):30-1.

Rodman, Fibers for nonwovens with emphasis on filtration theory and applications. Book of Papers for the National Technical Conference of AATCC. Jan. 1990:233-45.

U.S. Appl. No. 15/200,612, filed Jul. 1, 2016, Zhu et al.

* cited by examiner

MULTI-LAYERED ELECTRET-CONTAINING FILTRATION MEDIA

RELATED APPLICATIONS

This application is a continuation-in-part of U.S. application Ser. No. 15/200,612, filed Jul. 1, 2016, which is incorporated herein by reference in its entirety for all purposes.

FIELD OF INVENTION

The present embodiments relate generally to filter media and methods for filtering gas streams, and specifically, to filter media having efficiency stability and/or good performance characteristics such as low resistance.

BACKGROUND

Filter elements can be used to remove contamination in a variety of applications. Such elements can include a filter media which may be formed of a web of fibers. The fiber web provides a porous structure that permits gas (e.g., air) to flow through the media. Contaminant particles (e.g., dust particles, soot particles) contained within the fluid may be trapped on or in the fiber web. Depending on the application, the filter media may be designed to have different performance characteristics.

Although many types of filter media for filtering particulates from air exist, improvements in the physical and/or performance characteristics of the filter media (e.g., strength, air resistance, efficiency, and high dust holding capacity) would be beneficial.

SUMMARY OF THE INVENTION

Filter media are generally provided. The subject matter of this application involves, in some cases, interrelated products, alternative solutions to a particular problem, and/or a plurality of different uses of structures and compositions.

In one set of embodiments, a series of filter media are provided. In one embodiment, a filter media comprises a first layer comprising a plurality of fibers, wherein the first layer comprises a fluorinated species, and a second layer adjacent the first layer. The first layer has a first value of a thickness over instantaneous resistance of the first layer, the second layer has a second value of a thickness over instantaneous resistance of the second layer, and the ratio of the second value to the first value is less than or equal to 20. The filter media has an initial efficiency of greater than or equal to 95%.

In another embodiment, a filter media comprises a first layer comprising a plurality of fibers, wherein the first layer comprises a fluorinated species, and a second layer adjacent the first layer. The first layer has a value of thickness over instantaneous resistance of the first layer of greater than or equal to 2 mils/mmH$_2$O and less than or equal to 50 mils/mm H$_2$O. The second layer has a value of thickness over instantaneous resistance of the second layer of greater than or equal to 20 mils/mmH$_2$O and less than or equal to 150 mils/mm H$_2$O.

In another embodiment, a filter media comprises a first layer comprising a plurality of fibers and a second layer adjacent the first layer. The first layer has a first value of a thickness over instantaneous resistance of the first layer, the second layer has a second value of a thickness over instantaneous resistance of the second layer, and the ratio of the second value to the first value is less than or equal to 20. The filter media has an initial efficiency of greater than or equal to 95%.

In yet another embodiment, a filter media comprises a first layer comprising a plurality of fibers and a second layer. The first layer has a first value of a basis weight over air permeability of the first layer, the second layer has a second value of a basis weight over air permeability of the second layer, and the ratio of the first value to the second value is greater than or equal to 0.01 and less than or equal to 5 (e.g., greater than or equal to 0.01 and less than or equal to 4). The first layer has a basis weight of less than or equal to 20 g/m$^2$ and the plurality of fibers of the first layer have an average fiber diameter of greater than or equal to 1 micron and less than or equal to 8 microns. The second layer is charged and the second layer has a basis weight of greater than or equal to 30 g/m$^2$ and less than or equal to 85 g/m$^2$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
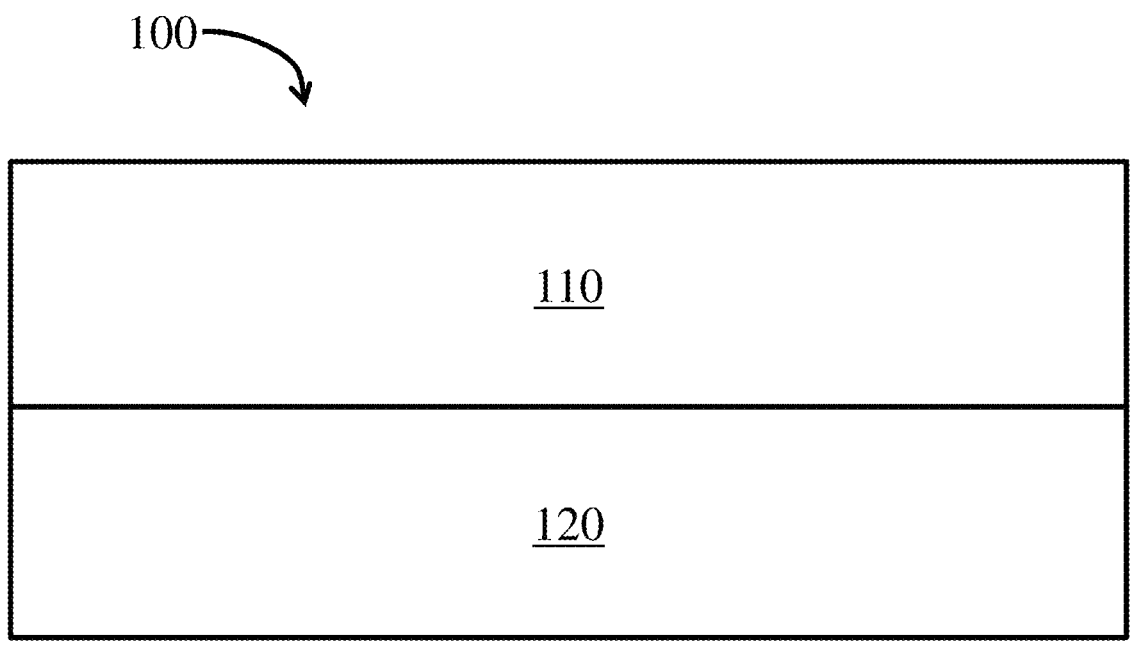
FIG. 1 is a schematic diagram showing a cross-section of a filter media according to one set of embodiments.

Filter media such as multi-layered electret-containing filtration media for filtering gas streams (e.g., air) are described herein. In some embodiments, the filter media may be designed to have desirable properties such as stable filtration efficiency, high oil repellency, low resistance, and/or stable service life. In certain embodiments, the filter media may be a composite of two or more types of fiber layers where each layer may be optimized to enhance its function without substantially negatively impacting the performance of another layer of the media. For example, one layer of the media may be designed to have a relatively high oil repellency, and another layer of the media may be designed to have stable filtration efficiency throughout the filter's lifetime. One or more layers of the media may have a certain value of thickness over instantaneous resistance (and/or a ratio of thickness over instantaneous resistance between two layers), as described in more detail below. The filter media described herein may be particularly well-suited for applications that involve filtering gas streams (e.g., face masks, cabin air filtration, vacuum filtration, room filtration, respirator equipment, as well as residential heating ventilation and air conditioning (HVAC) and industrial HVAC systems), though the media may also be used in other applications.

In certain embodiments, one or more layers of the media may have a certain value of basis weight over air permeability (and/or a ratio of a value of basis weight over air permeability between two layers), as described in more detail below. The filter media may optionally comprise a support layer with a relatively high air permeability (e.g., greater than or equal to 1100 CFM). In some cases, the filter may have a relatively low initial resistance and/or may have a particular final E1 efficiency according to the ASHRAE 52.2 standard described herein. The filter media may be needled together and in such embodiments does not comprise an adhesive or an adhesive layer, or is substantially free of adhesive.

In some embodiments, the filter media described herein may include a first layer, optionally including a fluorinated species, and a second layer that is charged. The first layer may be positioned upstream of the second layer (e.g., in a filter element) with respect to the direction of gas/fluid flow. Advantageously, the first layer may remove at least a portion of an oil present in a gas stream being filtered such that reduced amounts of the oil penetrates into the second layer, thereby minimizing discharge of the second layer. Since the presence of charges in the second layer can improve the efficiency (e.g., initial efficiency) of the media, this configuration of layers can stabilize the filtration efficiency of the filter media throughout its lifetime. In some embodiments, the filter media described herein may advantageously have lower resistance leading to, for example, more breathability (e.g., for face mask applications) compared to certain existing filter media.

In an alternative embodiment, the second layer may be positioned upstream of the first layer (e.g., in a filter element) with respect to the direction of gas/fluid flow.

An example of a filter media including two or more layers is shown in FIG. 1. As shown illustratively in FIG. 1, a filter media 100, shown in cross section, may include a first layer 110 and a second layer 120 adjacent first layer 110. In some cases, first layer 110 may be directly adjacent (i.e., in direct contact with at least a portion of) second layer 120. In alternative embodiments, second layer 120 may be positioned upstream or downstream of, but not in contact with, first layer 110. In some embodiments, the first layer is a non-wet laid layer imparting, for example, good oleophobic properties (e.g., high oil repellency) to the filter media and the second layer may be a charged layer having, for example, high efficiency (e.g., initial efficiency) with a relatively open fibrous structure. Other configurations are also possible. For example, in some cases, the filter media includes one or more support layers (e.g., spunbond layers), as described in more detail below.

The terms "first layer" and "second layer" as used herein generally refer to different layers of a filter media and do not necessarily denote a particular order of the layers (e.g., within a filter element). For example, while in some embodiments a first layer may be positioned upstream of the second layer with respect to the direction of fluid flow, in other embodiments the first layer may be positioned downstream of the second layer with respect to the direction of fluid flow. As used herein, when a layer is referred to as being "adjacent" another layer, it can be directly adjacent to the layer, or one or more intervening layers also may be present. A layer that is "directly adjacent" another layer means that no intervening layer is present.

In some embodiments, each of the first layer and/or the second layer may include a single layer. In other embodiments, however, the first layer and/or the second layer may include more than one layer (i.e., sublayers) to form a multi-layered structure. Each sublayer within a layer may be formed by the same process as the other sublayers within the layer. For example, in one set of embodiments, a first layer includes more than one sublayers formed by a non-wet laid process such as a meltblown process, a meltspun, a melt electrospinning, a solvent electrospinning, a centrifugal spinning process, or a spunbond process. When a layer includes more than one sublayer, the plurality of sublayers may be the same or may differ based on certain features such as basis weight, efficiency (e.g., initial efficiency), and/or thickness. Generally, however, each sublayer within a given layer comprises the same type of fibers as the other sublayer (s) within the given layer. For example, a first layer may include multiple sublayers, each sublayer including fibers formed by the same process (e.g., by a meltblown process). In certain cases, the plurality of sublayers may be discrete and combined by any suitable method, such as lamination, point bonding, or collating. In some embodiments, the sublayers are substantially joined to one another (e.g., by lamination, point bonding. thermo-dot bonding, ultrasonic bonding, calendering, use of adhesives (e.g., glue-web), and/or co-pleating). In some cases, sublayers may be formed as a composite layer (e.g., by a non-wet laid process).

Each of the sublayers of the first layer and/or second layer may have any suitable basis weight and/or thickness, such as those basis weights and thicknesses described herein for the overall layer (e.g., the first layer, the second layer). Additionally, each of the sublayers of the first layer and/or second layer may have performance characteristics (e.g., resistance, efficiency) of those described herein for the overall layer.

Figure 2:
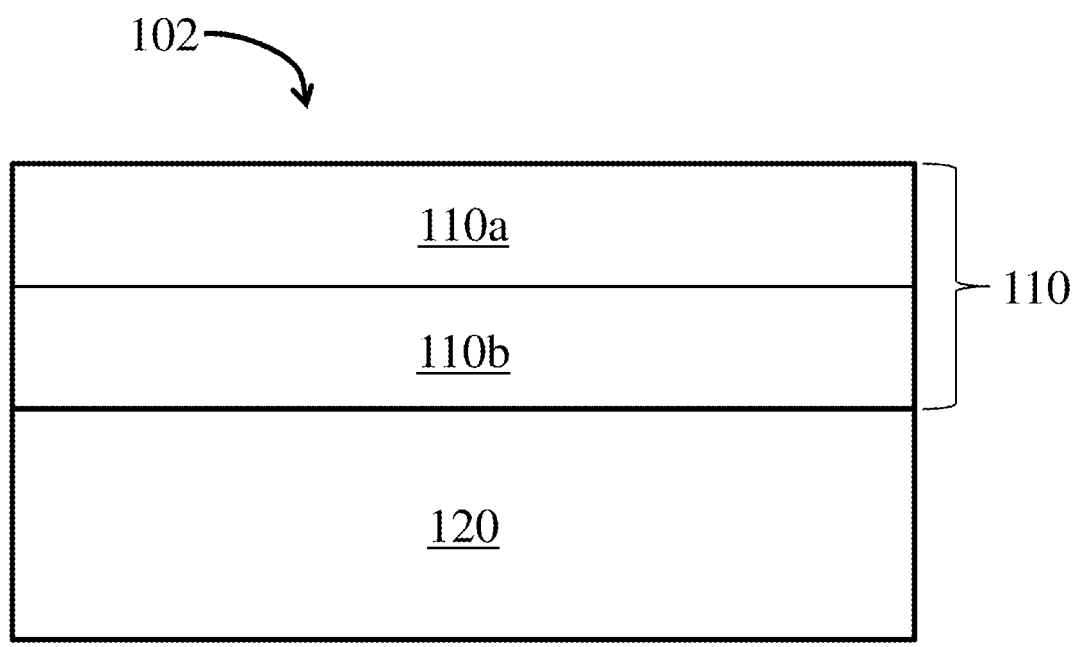
FIG. 2 is a schematic diagram showing a cross-section of a filter media according to one set of embodiments.
Figure 3:
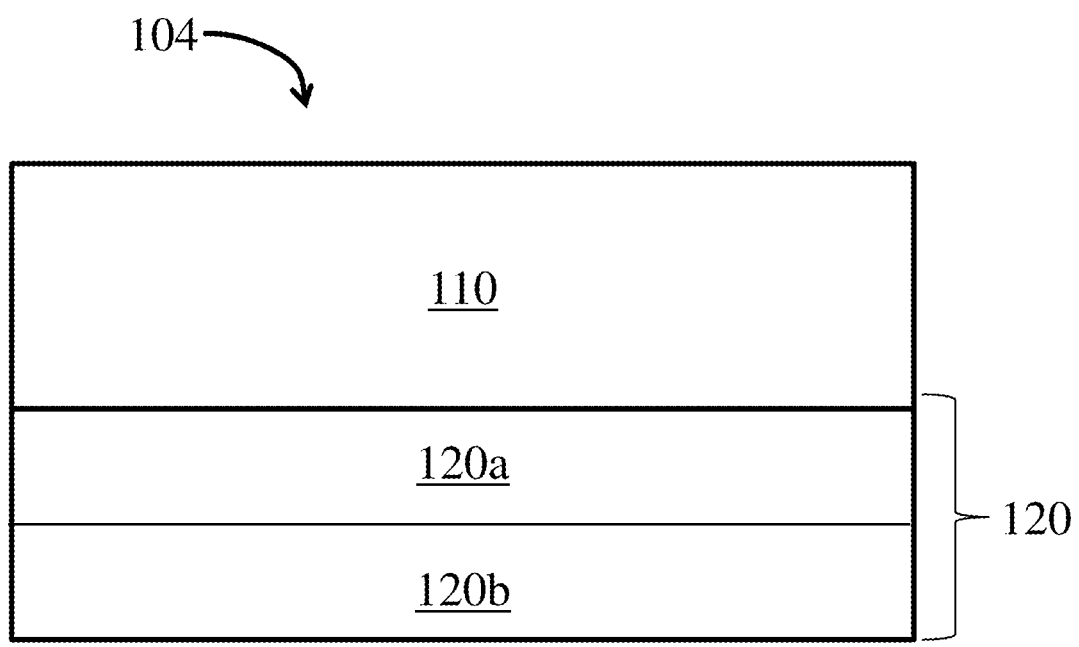
FIG. 3 is a schematic diagram showing a cross-section of a filter media according to one set of embodiments.
Figure 4:
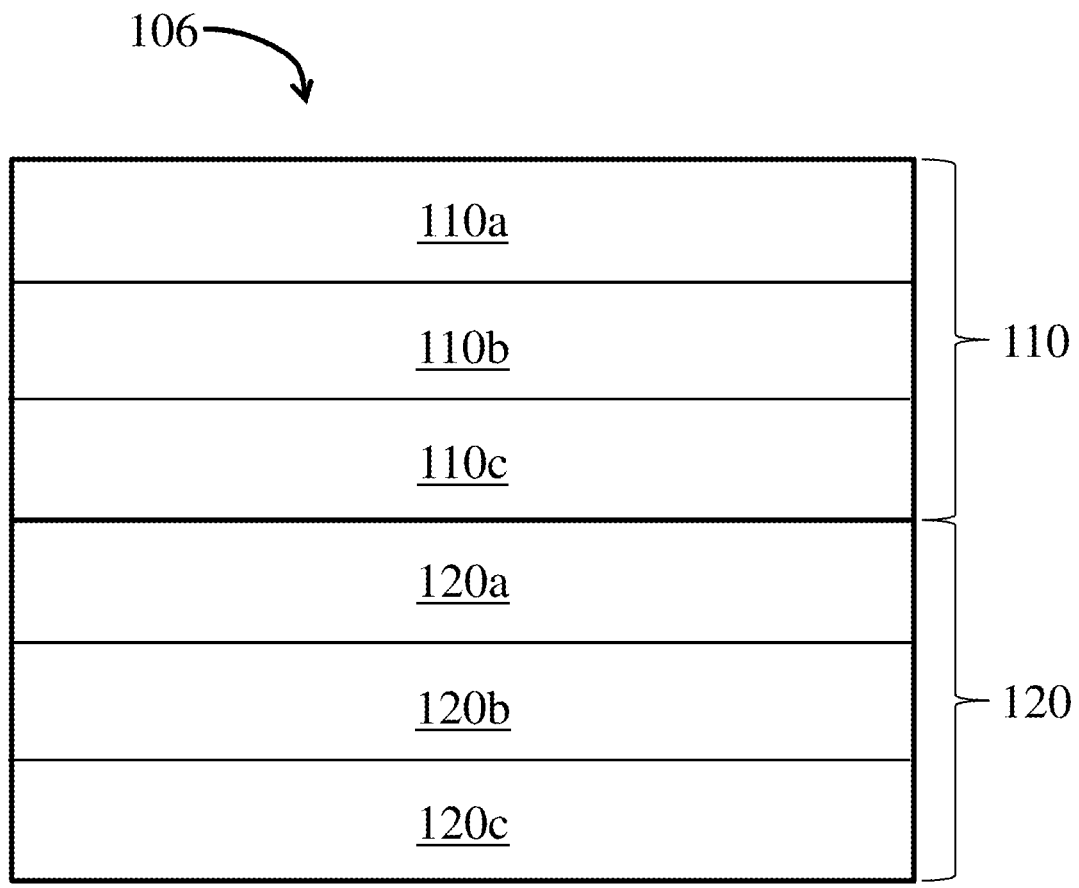
FIG. 4 is a schematic diagram showing a cross-section of a filter media according to one set of embodiments.

In some embodiments, a layer of the filter media may comprise two or more sublayers. In some cases, the first layer (e.g., a non-wet laid layer) may comprise two or more non-wet laid sublayers. For example, as shown illustratively in FIG. 2, filter media 102, shown in cross section, comprises a first layer 110 having a first non-wet laid sublayer 110a and a second non-wet laid sublayer 110b. The filter media also includes a second layer 120 adjacent first layer 110. In certain embodiments, the second layer (e.g., an efficiency layer and/or a charged layer) may comprise two or more sublayers. For example, as shown illustratively in FIG. 3, filter media 104 comprises first layer 110 and second layer 120 adjacent first layer 110, and having a first sublayer 120a and a second sublayer 120b. While two sublayers in each layer are shown, those skilled in the would understand that more than two sublayers (e.g., three sublayers, four sublayers, five sublayers) are also possible. In an exemplary embodiment, as shown illustratively in FIG. 4, a filter media 106 comprises first layer 110 having three non-wet laid sublayers 110a, 110b, and 110c, and second layer 120 adjacent first layer 110 having three charged sublayers 120*a*, 120*b*, and 120*c*. Other configurations are also possible.

The number of sublayers within the first layer and/or the second layer may be selected as desired. In some embodiments, the first layer comprises greater than or equal to 1, greater than or equal to 2, greater than or equal to 3, greater than or equal to 5, greater than or equal to 7, greater than or equal to 10, or greater than or equal to 12 sublayers (e.g., non-wet laid sublayers). In certain embodiments, the first layer comprises less than or equal to 15, less than or equal to 12, less than or equal to 10, less than or equal to 7, less than or equal to 5, less than or equal to 3, or less than or equal to 2 sublayers. Combinations of the above-referenced ranges are also possible (e.g., greater than or equal to 1 and less than or equal to 15 sublayers, greater than or equal to 1 and less than or equal to 5 sublayers, greater than or equal to 2 and less than or equal to 5 sublayers). Other ranges are also possible.

In some embodiments, the second layer comprises greater than or equal to 1, greater than or equal to 2, greater than or equal to 3, greater than or equal to 5, greater than or equal to 7, greater than or equal to 10, or greater than or equal to 12 sublayers (e.g., charged sublayers). In certain embodiments, the second layer comprises less than or equal to 15, less than or equal to 12, less than or equal to 10, less than or equal to 7, less than or equal to 5, less than or equal to 3, or less than or equal to 2 sublayers. Combinations of the above-referenced ranges are also possible (e.g., greater than or equal to 1 and less than or equal to 15 sublayers, greater than or equal to 1 and less than or equal to 5 sublayers, greater than or equal to 2 and less than or equal to 5 sublayers). Other ranges are also possible.

In some embodiments, the first layer is designed to have a particular value of basis weight over air permeability of the first layer. For example, the first layer may have a value of basis weight over air permeability of less than or equal to 0.2 $g/m^2/CFM$ and greater than or equal to 0.000125 $g/m^2/CFM$ or another suitable range described herein. A value of basis weight over air permeability for a particular layer, as used herein, is the ratio of the basis weight of the layer (including all sublayers of the layer) to the air permeability of the layer (including all sublayers of the layer). Measurements of basis weight and air permeability are described in more detail below.

In some embodiments, the first layer has a value of basis weight over air permeability of the first layer of less than or equal to 0.2 $g/m^2/CFM$, less than or equal to 0.1 $g/m^2/CFM$, less than or equal to 0.05 $g/m^2/CFM$, less than or equal to 0.01 $g/m^2/CFM$, less than or equal to 0.005 $g/m^2/CFM$, less than or equal to 0.001 $g/m^2/CFM$, less than or equal to 0.0005 $g/m^2/CFM$, or less than or equal to 0.00025 $g/m^2/CFM$. In certain embodiments, the first layer has a value of basis weight over air permeability of the first layer of greater than or equal to 0.000125 $g/m^2/CFM$, greater than or equal to 0.00025 $g/m^2/CFM$, greater than or equal to 0.0005 $g/m^2/CFM$, greater than or equal to 0.001 $g/m^2/CFM$, greater than or equal to 0.005 $g/m^2/CFM$, greater than or equal to 0.01 $g/m^2/CFM$, greater than or equal to 0.05 $g/m^2/CFM$, or greater than or equal to 0.1 $g/m^2/CFM$. Combinations of the above-referenced ranges are also possible (e.g., less than or equal to 0.2 $g/m^2/CFM$ and greater than or equal to 0.000125 $g/m^2/CFM$). Other ranges are also possible.

In some embodiments, the first layer (including one or more sublayers of the first layer) may be designed to have a particular air permeability (e.g., such that the value of basis weight over air permeability of the first layer is greater than or equal to 0.000125 $g/m^2/CFM$ and less than or equal to 0.2 $g/m^2/CFM$). In some embodiments, the air permeability of the first layer is greater than or equal to 100 CFM, greater than or equal to 200 CFM, greater than or equal to 250 CFM, greater than or equal to 300 CFM, greater than or equal to 350 CFM, greater than or equal to 400 CFM, greater than or equal to 450 CFM, greater than or equal to 500 CFM, greater than or equal to 550 CFM, greater than or equal to 600 CFM, greater than or equal to 650 CFM, greater than or equal to 700 CFM, or greater than or equal to 750 CFM. In certain embodiments, the air permeability of the first layer is less than or equal to 800 CFM, less than or equal to 750 CFM, less than or equal to 700 CFM, less than or equal to 650 CFM, less than or equal to 600 CFM, less than or equal to 550 CFM, less than or equal to 500 CFM, less than or equal to 450 CFM, less than or equal to 400 CFM, less than or equal to 350 CFM, less than or equal to 300 CFM, less than or equal to 250 CFM, or less than or equal to 200 CFM. Combinations of the above referenced ranges are also possible (e.g., greater than or equal to 100 CFM and less than or equal to 800 CFM, greater than or equal to 200 CFM and less than or equal to 650 CFM). Other ranges are also possible. Air permeability, as used herein, is measured according to the test standard ASTM D737 over 38 $cm^2$ surface area of the media and using a pressure of 125 Pa.

In some embodiments, the first layer is designed to have a particular value of thickness over instantaneous resistance of the layer (i.e., a thickness over instantaneous resistance factor). In general, it is preferable that filter media comprising a first layer have a particular value of thickness over instantaneous resistance of the first layer (e.g., greater than or equal to 2 mils/mm $H_2O$ and less than or equal to 50 mils/mm $H_2O$, or another suitable range described herein) which can increase the performance of filter media (e.g., lower resistance) as compared to certain existing filter media that do not have this feature. A value of thickness over instantaneous resistance (i.e., a thickness over instantaneous resistance factor), as used herein, is the ratio of the uncompressed thickness of a layer (including all sublayers of the layer) to the instantaneous resistance of the layer (including all sublayers of the layer). Measurements of uncompressed thickness and instantaneous resistance are described in more detail below.

In certain embodiments, the first layer has a value of thickness over instantaneous resistance of the first layer of greater than or equal to 2 mils/mm $H_2O$, greater than or equal to 3 mils/mm $H_2O$, greater than or equal to 5 mils/mm $H_2O$, greater than or equal to 10 mils/mm $H_2O$, greater than or equal to 15 mils/mm $H_2O$, greater than or equal to 20 mils/mm $H_2O$, greater than or equal to 25 mils/mm $H_2O$, greater than or equal to 30 mils/mm $H_2O$, greater than or equal to 35 mils/mm $H_2O$, greater than or equal to 40 mils/mm $H_2O$, or greater than or equal to 45 mils/mm $H_2O$. In some embodiments, the first layer has a value of thickness over instantaneous resistance of the first layer of less than or equal to 50 mils/mm $H_2O$, less than or equal to 45 mils/mm $H_2O$, less than or equal to 40 mils/mm $H_2O$, less than or equal to 35 mils/mm $H_2O$, less than or equal to 30 mils/mm $H_2O$, less than or equal to 25 mils/mm $H_2O$, less than or equal to 20 mils/mm $H_2O$, less than or equal to 15 mils/mm $H_2O$, less than or equal to 10 mils/mm $H_2O$, less than or equal to 5 mils/mm $H_2O$, or less than or equal to 3 mils/mm $H_2O$. Combinations of the above-referenced ranges are also possible (e.g., greater than or equal to 2 mils/mm $H_2O$ and less than or equal to 50 mils/mm $H_2O$, greater than or equal to 3 mils/mm $H_2O$ and less than or equal to 35 mils/mm $H_2O$). Other ranges are also possible.

In some embodiments, the first layer (including one or more sublayers of the first layer) may be designed to have a particular uncompressed thickness (e.g., such that the thickness over instantaneous resistance factor of the first layer is greater than or equal to 2 mils/mm $H_2O$ and less than or equal to 50 mils/mm $H_2O$). In some embodiments, the uncompressed thickness of the first layer may be greater than or equal to 1 mil, greater than or equal to 2 mils, greater than or equal to 5 mils, greater than or equal to 10 mils, greater than or equal to 25 mils, greater than or equal to 50 mils, greater than or equal to 100 mils, greater than or equal to 200 mils, greater than or equal to 250 mils, greater than or equal to 300 mils, or greater than or equal to 400 mils. In certain embodiments, the uncompressed thickness of the first layer (including one or more sublayers of the first layer) may be less than or equal to 500 mils, less than or equal to 400 mils, less than or equal to 300 mils, less than or equal to 250 mils, less than or equal to 200 mils, less than or equal to 100 mils, less than or equal to 50 mils, less than or equal to 25 mils, less than or equal to 10 mils, less than or equal to 5 mils, or less than or equal to 2 mils. Combinations of the above referenced ranges are also possible (e.g., greater than or equal to 1 mil and less than or equal to 500 mils, greater than or equal to 10 mils and less than or equal to 250 mils). Other ranges are also possible. Uncompressed thickness, as used herein, is determined using a Mitutoya uncompressed thickness measurement. Briefly, the fiber layer is compressed using a circular probe having a diameter of 1 mm under at least three different weights (e.g., 10 grams, 5 grams, 2 grams). The ordinary least squares linear regression is determined for each weight and corresponding thickness, and is used to calculated the thickness of the fiber layer corresponding to 0 grams of applied weight to determine the uncompressed thickness for that layer.

In some cases, the first layer may be designed to have a particular instantaneous resistance. In some embodiments, the first layer may have an instantaneous resistance of less than or equal to 40 mm $H_2O$, less than or equal to 35 mm $H_2O$, less than or equal to 30 mm $H_2O$, less than or equal to 25 mm $H_2O$, less than or equal to 20 mm $H_2O$, less than or equal to 15 mm $H_2O$, less than or equal to 10 mm $H_2O$, less than or equal to 5 mm $H_2O$, or less than or equal to 2 mm $H_2O$. In certain embodiments, the first layer may have an instantaneous resistance of greater than or equal to 0.1 mm $H_2O$, greater than or equal to 0.2 mm $H_2O$, greater than or equal to 0.5 mm $H_2O$, greater than or equal to 1 mm $H_2O$, greater than or equal to 2 mm $H_2O$, greater than or equal to 5 mm $H_2O$, greater than or equal to 10 mm $H_2O$, greater than or equal to 15 mm $H_2O$, greater than or equal to 20 mm $H_2O$, greater than or equal to 25 mm $H_2O$, greater than or equal to 30 mm $H_2O$, or greater than or equal to 35 mm $H_2O$. Combinations of the above referenced ranges are also possible (e.g., greater than or equal to 0.1 mm $H_2O$ and less than or equal to 40 mm $H_2O$, greater than or equal to 2 mm $H_2O$ and less than or equal to 15 mm $H_2O$). Other ranges are also possible. Measurements of instantaneous resistance are described below.

In certain embodiments, the first layer (or each sublayer of the first layer) has a particular instantaneous penetration. In some embodiments, the instantaneous penetration of the first layer is less than or equal to 15%, less than or equal to 10%, less than or equal to 5%, less than or equal to 3%, less than or equal to 2%, less than or equal to 1%, or less than or equal to 0.5%. In some embodiments, the instantaneous penetration of the first layer is greater than or equal to 0.01%, greater than or equal to 0.1%, greater than or equal to 0.5%, greater than or equal to 1%, greater than or equal to 2%, greater than or equal to 3%, greater than or equal to 5%, or greater than or equal to 10%. Combinations of the above-referenced ranges are also possible (e.g., less than or equal to 15% and greater than or equal to 0.01%). Other ranges are also possible. Measurements of instantaneous penetration are described below.

In some embodiments, the first layer (or each sublayer of the first layer) comprises a plurality of fibers. The fibers of the first layer (or each sublayer of the first layer) may be continuous or non-continuous. Continuous fibers and are made by a "continuous" fiber-forming process, such as a meltblown process, a meltspun, a melt electrospinning, a solvent electrospinning, a centrifugal spinning process, or a spunbond process, and typically have longer lengths than non-continuous fibers as described in more detail below. Non-continuous fibers are staple fibers that are generally cut (e.g., from a filament) or formed as non-continuous discrete fibers to have a particular length or a range of lengths as described in more detail below.

In certain embodiments, the plurality of fibers of the first layer (or each sublayer of the first layer) include synthetic fibers (synthetic polymer fibers). The synthetic fibers of the first layer (or each sublayer of the first layer) may be continuous fibers or staple fibers. Non-limiting examples of suitable synthetic fibers include polyester, polyaramid, polyimide, polyolefin (e.g., polyethylene), polypropylene, Kevlar, Nomex, halogenated polymers (e.g., polyethylene terephthalate), acrylics, polyphenylene oxide, polyphenylene sulfide, and combinations thereof. Synthetic fibers may also include multi-component fibers (i.e., fibers having multiple compositions such as bicomponent fibers).

In some embodiments, the synthetic fibers of the first layer (or in each sublayer of the first layer) are meltblown fibers, meltspun fibers, melt electrospun fibers, solvent electrospun fibers, centrifugal spun fibers, spunbond fibers, and/or combinations thereof, which may be formed of polymers described herein (e.g., polyester, polypropylene).

Synthetic fibers of the first layer (or in each sublayer of the first layer) may also include staple fibers. In some embodiments, the staple fibers may be multi-component fibers (i.e., fibers having multiple compositions such as bicomponent fibers).

In embodiments in which the first layer (or in each sublayer of the first layer) includes staple fibers, the layer may also include a binder (e.g., binder resin).

Other processes and materials used to form the first layer are also possible.

In some embodiments, the plurality of fibers (e.g., synthetic fibers, continuous fibers, staple fibers) in the first layer (or in each sublayer of the first layer) may have an average diameter of greater than or equal to 0.2 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 6 microns, greater than or equal to 8 microns, greater than or equal to 10 microns, greater than or equal to 15 microns, or greater than or equal to 20 microns. In some embodiments, the plurality of fibers in the first layer (or in each sublayer of the first layer) may have an average diameter of less than or equal to 20 microns, less than or equal to 15 microns, less than or equal to 10 microns, less than or equal to 8 microns, less than or equal to 7 microns, less than or equal to 6 microns, less than or equal to 5 microns, less than or equal to 4 microns, less than or equal to 3 microns, less than or equal to 2 microns, less than or equal to 1 micron, or less than or equal to 0.5 microns. Combinations of the above-referenced ranges are also possible (e.g., greater than or equal to 0.2 micron and less than or equal to 20 microns, greater than or equal to 1 micron and less than or equal to about 10 microns, greater than or equal to 1 micron and less than or equal to 8 microns). Other values of average fiber diameter for the first layer (or each sublayer of the first layer) are also possible.

In some embodiments, the first layer comprises a plurality of fibers (e.g., synthetic fibers, continuous fibers) having a continuous length. In certain embodiments, the plurality of fibers in the first layer (or in each sublayer of the first layer) may have an average length of greater than about 5 inches, greater than or equal to about 10 inches, greater than or equal to about 25 inches, greater than or equal to about 50 inches, greater than or equal to about 100 inches, greater than or equal to about 300 inches, greater than or equal to about 500 inches, greater than or equal to about 700 inches, or greater than or equal to about 900 inches. In some instances, the fibers may have an average length of less than or equal to about 1000 inches, less than or equal to about 800 inches, less than or equal to about 600 inches, less than or equal to about 400 inches, or less than or equal to about 100 inches. Combinations of the above-referenced ranges are also possible (e.g., greater than or equal to about 50 inches and less than or equal to about 1000 inches). Other ranges are also possible.

In other embodiments, the first layer comprises a plurality of fibers (e.g., synthetic fibers, staple fibers) having an average length of less than about 5 inches (127 mm). For example, the plurality of fibers in the first layer (or in each sublayer of the first layer) may have an average length of, for example, less than or equal to about 100 mm, less than or equal to about 80 mm, less than or equal to about 60 mm, less than or equal to about 40 mm, less than or equal to about 20 mm, less than or equal to about 10 mm, less than or equal to about 5 mm, less than or equal to about 1 mm, less than or equal to about 0.5 mm, or less than or equal to about 0.1 mm. In some instances, plurality of fibers in the first layer (or in each sublayer of the first layer) may have an average length of greater than or equal to about 0.02 mm, greater than or equal to about 0.1 mm, greater than or equal to about 0.5 mm, greater than or equal to about 1 mm, greater than or equal to about 5 mm, greater than or equal to about 10 mm, greater than or equal to about 20 mm, greater than or equal to about 40 mm, greater than or equal to about 60 mm. Combinations of the above-referenced ranges are possible (e.g., greater than or equal to about 0.02 mm and less than or equal to about 80 mm, greater than or equal to about 0.03 mm and less than or equal to about 40 mm). Other ranges are also possible.

The first layer, as described herein, may have certain structural characteristics, such as basis weight and/or solidity. For instance, in some embodiments, the first layer (or each of the sub-layers of the first layer) may have a basis weight of greater than or equal to 0.1 g/m$^2$, greater than or equal to 0.5 g/m$^2$, greater than or equal to 1 g/m$^2$, greater than or equal to 3 g/m$^2$, greater than or equal to 10 g/m$^2$, greater than or equal to 25 g/m$^2$, greater than or equal to 30 g/m$^2$, greater than or equal to 40 g/m$^2$, greater than or equal to 50 g/m$^2$, greater than or equal to 60 g/m$^2$, greater than or equal to 70 g/m$^2$, greater than or equal to 80 g/m$^2$, greater than 85 g/m$^2$, greater than or equal to 90 g/m$^2$, greater than or equal to 100 g/m$^2$, greater than or equal to 200 g/m$^2$, greater than or equal to 300 g/m$^2$, or greater than or equal to 400 g/m$^2$. In some instances, the first layer (or each of the sub-layers of the first layer) may have a basis weight of less than or equal to 500 g/m$^2$, less than or equal to 400 g/m$^2$, less than or equal to 300 g/m$^2$, less than or equal to 200 g/m$^2$, less than or equal to 100 g/m$^2$, less than or equal to 90 g/m$^2$, less than or equal to 85 g/m$^2$, less than or equal to 80 g/m$^2$, less than or equal to 70 g/m$^2$, less than or equal to 60 g/m$^2$, less than or equal to 50 g/m$^2$, less than or equal to 40 g/m$^2$, less than or equal to 30 g/m$^2$, less than or equal to 25 g/m$^2$, less than or equal to 10 g/m$^2$, less than or equal to 3 g/m$^2$, less than or equal to 1 g/m$^2$, or less than or equal to 0.5 g/m$^2$. Combinations of the above-referenced ranges are also possible (e.g., a basis weight of greater than or equal to 0.1 g/m$^2$ and less than or equal to 500 g/m$^2$, a basis weight of greater than or equal to 10 g/m$^2$ and less than or equal to 250 g/m$^2$, a basis weight of greater than or equal to 6 g/m$^2$ and less than or equal to 80 g/m$^2$, a basis weight of greater than or equal to 0.1 g/m$^2$ and less than or equal to 20 g/m$^2$). Other values of basis weight are also possible. The basis weight may be determined according to the standard ISO 536. In one particular set of embodiments, the first layer has a basis weight of less than or equal to 20 g/m$^2$.

In some embodiments, the first layer (or each of the sub-layers of the first layer) may have a solidity of greater than or equal to 0.1%, greater than or equal to 0.5%, greater than or equal to 1%, greater than or equal to 5%, greater than or equal to 10%, greater than or equal to 20%, or greater than or equal to 40%. In certain embodiments, the first layer (or each of the sub-layers of the first layer) may have a solidity of less than or equal to 50%, less than or equal to 40%, less than or equal to 30%, less than or equal to 20%, less than or equal to 10%, less than or equal to 5%, less than or equal to 1%, or less than or equal to 0.5%. Combinations of the above-referenced ranges are also possible (e.g., a solidity of greater than or equal to 0.1% and less than or equal to 50%, greater than or equal to 1% and less than or equal to 20%). Other ranges are also possible. Solidity generally refers to the percentage of volume of solids with respect to the total volume of the layer.

In some embodiments, the first layer (or one or more sublayers of the first layer) comprises a fluorinated species. In some embodiments, each sublayer of the first layer comprises a fluorinated species. The fluorinated species may impart a certain level of oil repellency to the media. Non-limiting examples of fluorinated species include fluorocarbons such as those having the formula —$C_nF_{2n+1}$ or —$C_nF_m$, where n is an integer greater than 1, and m is an integer greater than 1. In some embodiments, n is less than or equal to 8, less than or equal 6, less than or equal 5, or less than or equal to 4. In some embodiments, m is less than or equal to 14, less than or equal to 13, less than or equal to 12, less than or equal to 8, less than or equal 6, less than or equal 5, or less than or equal to 4. Specific examples of fluorocarbons include $CF_4$, $C_2F_4$, $C_3F_6$, $C_3F_8$, $C_4F_8$, $C_5F_{12}$, $C_6F_6$, $C_6F_{12}$, and $C_6F_{13}$.

In other embodiments, fluorinated species include fluorocarbons such as those having the formula $C_nF_m$—$(C_xH_y)$—Z, where n is an integer equal or greater than 1, m is an integer equal or greater than 1, x is an integer greater than 0, y is an integer greater than 0, and Z is an end functional group that can be selected from the group consisting of acrylate, methacrylate, alcohol, aldehyde, carboxylic acid, olefins, silane, bromide, iodide, thiol, amine, phenol, isocyanate, sulfonate, epoxide, and ether. In some embodiments, n is less than or equal to 11, less than or equal to 8, less than or equal 6, less than or equal 5, or less than or equal to 4. In some embodiments, m is less than or equal to 14, less than or equal to 13, less than or equal to 12, less than or equal to 8, less than or equal 6, less than or equal 5, or less than or equal to 4. In some embodiments, x is less than or equal to 12, less than or equal to 8, less than or equal 6, less than or equal 5, or less than or equal to 4. In some embodiments, y is less than or equal to 25, less than or equal to 20, less than or equal to 15, less than or equal to 10, less than or equal to 8, less than or equal 6, less than or equal 5, or less than or equal to 4. The value of m may vary depending on the value of n, and the value of y may depend on the value of x. In some cases, —$(C_xH_y)$— is a linear alkane or a branched alkane.

In some embodiments, one or more fluorinated species are present in the first layer (e.g., as a coating) in an amount of greater than or equal to 0.01%, greater than or equal to 0.05%, greater than or equal to 0.1%, greater than or equal to 0.5%, greater than or equal to 0.75%, greater than or equal to 1%, greater than or equal to 2%, greater than or equal to 3%, or greater than or equal to 5% by weight of the total dry weight of the first layer. In certain embodiments, one or more fluorinated species are present in the first layer (e.g., as a coating) in an amount of less than or equal to 10%, less than or equal to 5%, less than or equal to 3%, less than or equal to 2%, less than or equal to 1%, less than or equal to 0.75%, less than or equal to 0.5%, less than or equal to 0.1%, or less than or equal to 0.05% by weight of the total dry weight of the first layer. Combinations of the above referenced ranges are also possible (e.g., greater than or equal to 0.01% and less than or equal to 10%, greater than or equal to 0.01% and less than or equal to 5%, greater than or equal to 0.05% and less than or equal to 3%, greater than or equal to 0.1% and less than or equal to 2%, greater than or equal to 0.2% and less than or equal to 0.75%). Other ranges are also possible.

The first layer, or one or more sublayers of the first layer, may be modified to comprise a fluorinated species using any suitable method. In some embodiments, the entire layer may be modified (e.g., through its thickness). For example, the interior and the surfaces of the layer (or one or more sublayers of the layer) may be modified with a fluorinated species. In certain embodiments, the interior of the layer (or one or more sublayers of the layer) may be modified without one or more outer surfaces of the layer (or one or more sublayers of the layer) being modified.

In general, any suitable method for modifying the surface and/or the interior of a layer (or one or more sublayers of the layer) may be used. In some embodiments, a coating method is used to coat a layer with a fluorinated species. For example, filter media may undergo a coating process (e.g., chemical vapor deposition), such that one or more outer surfaces of an interior layer and/or bottom layer is not coated, while the porous interior of the layer is coated. In some embodiments, the surface and/or interior of a layer (or one or more sublayers of the layer) may be modified by coating at least a portion of the surface and/or interior. In certain embodiments, a coating process involves introducing resin or a material (e.g., a fluorinated species) dispersed in a solvent or solvent mixture into a pre-formed fiber layer (e.g., a pre-formed fiber layer formed by a meltblown process, etc.).

Non-limiting examples of coating methods include the use of vapor deposition (e.g., chemical vapor, physical vapor deposition), layer-by-layer deposition, wax-solidification, self-assembly, sol-gel processing, a slot die coater, gravure coating, screen coating, size press coating (e.g., a two roll-type or a metering blade type size press coater), film press coating, blade coating, roll-blade coating, air knife coating, roll coating, foam application, reverse roll coating, bar coating, curtain coating, champlex coating, brush coating, Bill-blade coating, short dwell-blade coating, lip coating, gate roll coating, gate roll size press coating, laboratory size press coating, melt coating, dip coating, knife roll coating, spin coating, spray coating (e.g., electrospraying), gapped roll coating, roll transfer coating, padding saturant coating, and saturation impregnation.

In one set of embodiments, the first layer described herein may be modified using chemical vapor deposition (e.g., chemical vapor deposition of a fluorinated species). In chemical vapor deposition, the fiber layer is exposed to gaseous reactants from gas or liquid vapor that are deposited onto the fiber layer under high energy level excitation such as thermal, microwave, UV, electron beam or plasma. Optionally, a carrier gas such as oxygen, helium, argon and/or nitrogen may be used.

Other vapor deposition methods include atmospheric pressure chemical vapor deposition (APCVD), low pressure chemical vapor deposition (LPCVD), metal-organic chemical vapor deposition (MOCVD), plasma assisted chemical vapor deposition (PACVD) or plasma enhanced chemical vapor deposition (PECVD), laser chemical vapor deposition (LCVD), photochemical vapor deposition (PCVD), chemical vapor infiltration (CVI) and chemical beam epitaxy (CBE).

In physical vapor deposition (PVD) thin films are deposited by the condensation of a vaporized form of the desired film material onto substrate. This method involves physical processes such as high-temperature vacuum evaporation with subsequent condensation, or plasma sputter bombardment rather than a chemical reaction.

After applying the coating to the first layer, the coating may be dried or cured by any suitable method. Non-limiting examples of drying or curing methods include the use of a photo dryer, infrared dryer, ultraviolet source, electron beam, hot air oven steam-heated cylinder, or any suitable type of dryer familiar to those of ordinary skill in the art.

It should be appreciated that in some embodiments, the first layer (and any sublayers), the second layer, and/or the entire media does not include a fluorinated species (e.g., does not comprise a coating such as a chemical vapor deposition coating comprising a fluorinated species).

The first layer, or one or more sublayers of the first layer, may be, in some cases, charged. For example, in some embodiments, the first layer comprises a plurality of charged fibers. In alternative embodiments, however, the first layer (or one or more sublayers of the first layer) is/are not charged.

As described herein, a filter media may include a second layer with optional sublayers. In some embodiments, the second layer is an efficiency layer (i.e., it increases the efficiency/initial efficiency of the overall media). As described in more detail below, in some embodiments the second layer is a charged layer (an electret layer).

In some embodiments, the second layer is designed to have a particular value of basis weight over air permeability of the second layer. In general, it is preferable that filter media comprising a second layer have a particular value of basis weight over air permeability of the second layer (e.g., greater than or equal to 0.03 $g/m^2$/CFM and less than or equal to 0.25 $g/m^2$/CFM, or another suitable range described herein). A value of basis weight over air permeability, as used herein, is the ratio of the basis weight (including all sublayers of the layer) to the air permeability (including all sublayers of the layer). Measurements of basis weight and air permeability are described herein.

In some embodiments, the second layer has a value of basis weight over air permeability of the second layer of less than or equal to 0.25 $g/m^2$/CFM, less than or equal to 0.2 g/m²/CFM, less than or equal to 0.175 g/m²/CFM, less than or equal to 0.15 g/m²/CFM, less than or equal to 0.125 g/m²/CFM, less than or equal to 0.1 g/m²/CFM, less than or equal to 0.09 g/m²/CFM, less than or equal to 0.07 g/m²/CFM, less than or equal to 0.05 g/m²/CFM, or less than or equal to 0.04 g/m²/CFM. In certain embodiments, the second layer has a value of basis weight over air permeability of the second layer of greater than or equal to 0.03 g/m²/CFM, greater than or equal to 0.04 g/m²/CFM, greater than or equal to 0.05 g/m²/CFM, greater than or equal to 0.07 g/m²/CFM, greater than or equal to 0.09 g/m²/CFM, greater than or equal to 0.1 g/m²/CFM, greater than or equal to 0.125 g/m²/CFM, greater than or equal to 0.15 g/m²/CFM, greater than or equal to 0.175 g/m²/CFM, or greater than or equal to 0.2 g/m²/CFM. Combinations of the above-referenced ranges are also possible (e.g., greater than or equal to 0.03 g/m²/CFM and less than or equal to 0.25 g/m²/CFM). Other ranges are also possible.

In some embodiments, the second layer (including one or more sublayers of the second layer) may be designed to have a particular air permeability (e.g., such that the value of basis weight over air permeability of the second layer is greater than or equal to 0.03 g/m²/CFM and less than or equal to 0.25 g/m²/CFM). In some embodiments, the air permeability of the second layer is greater than or equal to 200 CFM, greater than or equal to 250 CFM, greater than or equal to 300 CFM, greater than or equal to 330 CFM, greater than or equal to 350 CFM, greater than or equal to 400 CFM, greater than or equal to 500 CFM, greater than or equal to 600 CFM, greater than or equal to 650 CFM, greater than or equal to 700 CFM, greater than or equal to 800 CFM, or greater than or equal to 900 CFM. In certain embodiments, the air permeability of the second layer is less than or equal to 1000 CFM, less than or equal to 900 CFM, less than or equal to 800 CFM, less than or equal to 700 CFM, less than or equal to 600 CFM, less than or equal to 500 CFM, less than or equal to 400 CFM, less than or equal to 350 CFM, less than or equal to 330 CFM, less than or equal to 300 CFM, or less than or equal to 250 CFM. Combinations of the above referenced ranges are also possible (e.g., greater than or equal to 200 CFM and less than or equal to 1000 CFM, greater than or equal to 330 CFM and less than or equal to 1000 CFM). Other ranges are also possible.

In some embodiments, the second layer is designed to have a particular thickness over instantaneous resistance factor. In general, it is preferable that filter media comprising a second layer have a particular value of thickness over instantaneous resistance of the second layer (e.g., greater than or equal to 20 mils/mm H₂O and less than or equal to 150 mils/mm H₂O, or another suitable range as described herein), which can increase the performance of filter media (e.g., lower resistance) as compared to certain existing filter media that do not have this feature.

In certain embodiments, the second layer has a value of thickness over instantaneous resistance of the second layer (i.e., a thickness over instantaneous resistance factor) of greater than or equal to 20 mils/mm H₂O, greater than or equal to 30 mils/mm H₂O, greater than or equal to 40 mils/mm H₂O, greater than or equal to 50 mils/mm H₂O mils/mm H₂O, greater than or equal to 75 mils/mm H₂O, greater than or equal to 100 mils/mm H₂O, or greater than or equal to 125 mils/mm H₂O. In some embodiments, the second layer has a thickness over instantaneous resistance factor of less than or equal to 150 mils/mm H₂O, less than or equal to 125 mils/mm H₂O, less than or equal to 100 mils/mm H₂O, less than or equal to 75 mils/mm H₂O, less than or equal to 50 mils/mm H₂O, less than or equal to 40 mils/mm H₂O, or less than or equal to 30 mils/mm H₂O. Combinations of the above-referenced ranges are also possible (e.g., greater than or equal to 20 mils/mm H₂O and less than or equal to 150 mils/mm H₂O, greater than or equal to 40 mils/mm H₂O and less than or equal to 125 mils/mm H₂O). Other ranges are also possible.

In some embodiments, the second layer may be designed to have a particular uncompressed thickness (e.g., such that the thickness over instantaneous resistance factor of the second layer is greater than or equal to 20 mils/mm H₂O and less than or equal to 150 mils/mm H₂O). In some embodiments, the uncompressed thickness of the second layer may be greater than or equal to 5 mils, greater than or equal to 10 mils, greater than or equal to 25 mils, greater than or equal to 30 mils, greater than or equal to 50 mils, greater than or equal to 100 mils, greater than or equal to 200 mils, greater than or equal to 250 mils, greater than or equal to 300 mils, greater than or equal to 350 mils, greater than or equal to 400 mils, or greater than or equal to 500 mils. In certain embodiments, the uncompressed thickness of the second layer may be less than or equal to 600 mils, less than or equal to 500 mils, less than or equal to 400 mils, less than or equal to 350 mils, less than or equal to 300 mils, less than or equal to 250 mils, less than or equal to 200 mils, less than or equal to 100 mils, less than or equal to 50 mils, less than or equal to 30 mils, less than or equal to 25 mils, or less than or equal to 10 mils. Combinations of the above referenced ranges are also possible (e.g., greater than or equal to 5 mils and less than or equal to 600 mils, greater than or equal to 30 mils and less than or equal to 350 mils). Other ranges are also possible.

In some cases, the second layer may be designed to have a particular instantaneous resistance. In certain embodiments, the second layer may have an instantaneous resistance of greater than or equal to 0.1 mm H₂O, greater than or equal to 0.2 mm H₂O, greater than or equal to 0.5 mm H₂O, greater than or equal to 1 mm H₂O, greater than or equal to 2 mm H₂O, or greater than or equal to 5 mm H₂O. In some embodiments, the second layer may have an instantaneous resistance of less than or equal to 10 mm H₂O, less than or equal to 5 mm H₂O, or less than or equal to 2 mm H₂O. Combinations of the above referenced ranges are also possible (e.g., greater than or equal to 0.1 mm H₂O and less than or equal to 20 mm H₂O, greater than or equal to 1 mm H₂O and less than or equal to 4 mm H₂O). Other ranges are also possible. Measurements of instantaneous resistance are described below.

In certain embodiments, the second layer (or each sublayer of the second layer) as a particular instantaneous penetration. In some embodiments, the instantaneous penetration of the second layer is less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 5%, less than or equal to 3%, less than or equal to 2%, less than or equal to 1%, or less than or equal to 0.5%. In some embodiments, the instantaneous penetration of the second layer is greater than or equal to 0.01%, greater than or equal to 0.1%, greater than or equal to 0.5%, greater than or equal to 1%, greater than or equal to 2%, greater than or equal to 3%, greater than or equal to 5%, greater than or equal to 10%, greater than or equal to 20%, greater than or equal to 30%, or greater than or equal to 40%. Combinations of the above-referenced ranges are also possible (e.g., less than or equal to 15% and greater than or equal to 0.01%, less than or equal to 50% and greater than or equal to 0.01%). Other ranges are also possible. Measurements of instantaneous penetration are described below.

In some embodiments, the second layer (or each sublayer of the second layer) comprises a plurality of fibers. The fibers of the second layer (or each sublayer of the second layer) may be non-continuous (e.g., staple fibers) or continuous, and may be optionally charged. Accordingly, the second layer may be charged in some embodiments.

In certain embodiments, the plurality of fibers of the second layer (or each sublayer of the second layer) include synthetic fibers (synthetic polymer fibers). The synthetic fibers of the second layer (or each sublayer of the second layer) may be staple fibers or continuous fibers. Non-limiting examples of suitable synthetic fibers include polypropylene, dry-spun acrylic (e.g., produced from a dry-spinning process), polyvinyl chloride, mod-acrylic, wet spun acrylic, polytetrafluoroethylene, polypropylene, polystyrene, polysulfone, polyethersulfone, polycarbonate, nylon (e.g., nylon 6/6), polyurethane, phenolic, polyvinylidene fluoride, polyester, polyaramid, polyimide, polyolefin (e.g., polyethylene), Kevlar, Nomex, halogenated polymers (e.g., polyethylene terephthalate), polyacrylics, polyphenylene oxide, polyphenylene sulfide, and combinations thereof. In some embodiments, the synthetic fibers are halogen-free such that significant dioxins are not detectable when incinerated. For example, the fibers may be halogen-free acrylic fibers formed by dry spinning. In some embodiments, the second layer and/or the entire filter media is halogen-free such that significant dioxins are not detectable when incinerated.

In certain embodiments, the plurality of fibers in the second layer are staple fibers that are synthetic polymer fibers, and are carded. The fibers of the second layer may be charged.

In other embodiments, the plurality of fibers in the second layer include synthetic fibers (synthetic polymer fibers) formed by a continuous fiber-forming process such as a meltblown process, a meltspun, a melt electrospinning, a solvent electrospinning, a centrifugal spinning process, or a spunbond process. For example, in some embodiments, the synthetic fibers are meltblown fibers, meltspun fibers, melt electrospun fibers, solvent electrospun fibers, centrifugal spun fibers, spunbond fibers, and/or combinations thereof. Synthetic fibers may also include multi-component fibers (i.e., fibers having multiple compositions such as bicomponent fibers). In some cases, synthetic fibers may include meltblown fibers, which may be formed of polymers described herein (e.g., polyester, polypropylene). Other processes and materials used to form the second layer are also possible. The fibers of the second layer may be charged.

In some embodiments, the second layer comprises a mixture of two or more polymeric fibers. For instance, the second layer may comprise at least a first plurality of fibers comprising a first polymer and a second plurality of fibers comprising a second polymer. In certain embodiments, the first polymer and the second polymer are selected such that the first polymer and the second polymer have different dielectric constants. The two polymers having different dielectric constants may facilitate charging of the layer (e.g., triboelectric charging). Without wishing to be bound by theory, two polymers with different dielectric constants in the layer may come into frictional contact during manufacture of the layer such that one polymer will lose electrons and give them away to the other polymer and, as a result, the polymer losing electrons is net positively charged, the other polymer receiving electrons is net negatively charged. In embodiments in which the second layer of the filter media is a charged layer, the charged layer may have one or more characteristics described in commonly-owned U.S. Pat. No. 6,623,548, entitled "Filter materials and methods for the production thereof", issued Sep. 23, 2003, which is incorporated herein by reference in its entirety for all purposes. For example, in some embodiments, the second layer is an electrostatically charged layer formed by blending together polypropylene fibers with halogen free acrylic fibers, polypropylene with polyvinyl chloride (PVC) fibers, or a mixture of halogen free acrylic fibers and PVC fibers and, optionally, carding the blended fibers so as to form a non-woven fabric.

In some embodiments, the difference in dielectric constants between the first polymer and the second polymer may be selected to be greater than or equal to 0.8, greater than or equal to 1, greater than or equal to 1.2, greater than or equal to 1.5, greater than or equal to 2, greater than or equal to 3, greater than or equal to 5, or greater than or equal to 7. In certain embodiments, the difference in dielectric constants between the first polymer and the second polymer may be selected to be less than or equal to 8, less than or equal to 7, less than or equal to 5, less than or equal to 3, less than or equal to 2, less than or equal to 1.5, less than or equal to 1.2, or less than or equal to 1. Combinations of the above-referenced ranges are also possible (e.g., greater than or equal to 0.8 and less than or equal to 8, greater than or equal to 1.5 and less than or equal to 5). Other ranges are also possible.

Table 1 shows dielectric constants for several exemplary polymers.

TABLE 1

| Materials | Dielectric constant |
|---|---|
| Polytetrafluoroethylene | 2.10 |
| Polypropylene | 2.2-2.36 |
| Polyethylene | 2.25-2.35 |
| Polystyrene | 2.45-2.65 |
| Polyvinyl chloride | 2.8-3.1 |
| Polysulfone | 3.07 |
| Polyethersulfone | 3.10 |
| Polyethylene terephthalate | 3.1 |
| Polycarbonate | 3.17 |
| Acrylic | 3.5-4.5 |
| Paper | 3.85 |
| Nylon 6/6 | 4.0-4.6 |
| Polyurethane | 6.3 |
| Phenolic | 6.5 |
| Polyvinylidene fluoride | 8.4 |

The first polymer and the second polymer may be present in the second layer (or in each of the sublayers of the second layer) in any suitable amount. For example, in some embodiments, the first polymer is present in the second layer (or in each of the sublayers of the second layer) in an amount of greater than or equal to 25 wt %, greater than or equal to 30 wt %, greater than or equal to 35 wt %, greater than or equal to 40 wt %, greater than or equal to 50 wt %, greater than or equal to 60 wt %, greater than or equal to 65 wt %, or greater than or equal to 70 wt % with respect to the total amount of fibers in the layer and/or the total weight of the layer. In certain embodiments, the first polymer is present in the second layer in an amount of less than or equal to 75 wt %, less than or equal to 70 wt %, less than or equal to 65 wt %, less than or equal to 60 wt %, less than or equal to 50 wt %, less than or equal to 40 wt %, less than or equal to 35 wt %, or less than or equal to 30 wt % with respect to the total amount of fibers in the layer and/or the total weight of the layer. Combinations of the above referenced ranges are also possible (e.g., greater than or equal to 25 wt % and less than or equal to 75 wt %). Other ranges are also possible.

In some embodiments, the second polymer is present in the second layer (or in each of the sublayers of the second layer) in an amount of less than or equal to 75 wt %, less than or equal to 70 wt %, less than or equal to 65 wt %, less than or equal to 60 wt %, less than or equal to 50 wt %, less than or equal to 40 wt %, less than or equal to 35 wt %, or less than or equal to 30 wt % with respect to the total amount of fibers in the layer and/or the total weight of the layer. In certain embodiments, the second polymer is present in the second layer in an amount of greater than or equal to 25 wt %, greater than or equal to 30 wt %, greater than or equal to 35 wt %, greater than or equal to 40 wt %, greater than or equal to 50 wt %, greater than or equal to 60 wt %, greater than or equal to 65 wt %, or greater than or equal to 70 wt % with respect to the total amount of fibers in the layer and/or the total weight of the layer. Combinations of the above referenced ranges are also possible (e.g., greater than or equal to 25 wt % and less than or equal to 75 wt %). Other ranges are also possible.

In some embodiments, the second layer comprises the first polymer in an amount of greater than or equal to about 25 wt % and less than or equal to 75 wt % and the second polymer in an amount of less than or equal to 75 wt % and greater than or equal to about 25 wt % with respect to the total amount of fibers in the layer. For example, the second layer may comprise the first polymer in an amount of greater than or equal to about 45 wt % and less than or equal to 55 wt %, and the second polymer in an amount of less than or equal to 55 wt % and greater than or equal to about 45 wt %, with respect to the total amount of fibers in the layer. In certain embodiments, the second layer comprises each of the first polymer and the second polymer in an amount of about 50 wt % with respect to the total amount of fibers in the layer.

In some embodiments, the second layer comprises a plurality of fibers (e.g., synthetic fibers, staple fibers) having an average length of less than about 5 inches (127 mm). For example, the plurality of fibers in the second layer (or in each sublayer of the second layer) may have an average length of, for example, less than or equal to about 100 mm, less than or equal to about 80 mm, less than or equal to about 60 mm, less than or equal to about 40 mm, less than or equal to about 20 mm, less than or equal to about 10 mm, less than or equal to about 5 mm, less than or equal to about 1 mm, less than or equal to about 0.5 mm, or less than or equal to about 0.1 mm. In some instances, plurality of fibers in the second layer (or in each sublayer of the second layer) may have an average length of greater than or equal to about 0.02 mm, greater than or equal to about 0.1 mm, greater than or equal to about 0.5 mm, greater than or equal to about 1 mm, greater than or equal to about 5 mm, greater than or equal to about 10 mm, greater than or equal to about 20 mm, greater than or equal to about 40 mm, greater than or equal to about 60 mm. Combinations of the above-referenced ranges are possible (e.g., greater than or equal to about 1 mm and less than or equal to about 80 mm, greater than or equal to about 1 mm and less than or equal to about 60 mm). Other ranges are also possible.

In other embodiments, the second layer comprises a plurality of fibers (e.g., synthetic fibers, continuous fibers) having a continuous length. In certain embodiments, the plurality of fibers in the second layer (or in each sublayer of the second layer) may have an average length of greater than about 5 inches, greater than or equal to about 10 inches, greater than or equal to about 25 inches, greater than or equal to about 50 inches, greater than or equal to about 100 inches, greater than or equal to about 300 inches, greater than or equal to about 500 inches, greater than or equal to about 700 inches, or greater than or equal to about 900 inches. In some instances, the fibers may have an average length of less than or equal to about 1000 inches, less than or equal to about 800 inches, less than or equal to about 600 inches, less than or equal to about 400 inches, or less than or equal to about 100 inches. Combinations of the above-referenced ranges are also possible (e.g., greater than or equal to about 50 inches and less than or equal to about 1000 inches).

The second layer, as described herein, may have certain structural characteristics, such as basis weight and/or solidity. For instance, in some embodiments, the second layer (or each of the sub-layers of the second layer) may have a basis weight of greater than or equal to 20 $g/m^2$, greater than or equal to 25 $g/m^2$, greater than or equal to 30 $g/m^2$, greater than or equal to 40 $g/m^2$, greater than or equal to 50 $g/m^2$, greater than or equal to 60 $g/m^2$, greater than or equal to 70 $g/m^2$, greater than or equal to 80 $g/m^2$, greater than or equal to 85 $g/m^2$, greater than or equal to 90 $g/m^2$, greater than or equal to 100 $g/m^2$, greater than or equal to 200 $g/m^2$, greater than or equal to 300 $g/m^2$, greater than or equal to 400 $g/m^2$, or greater than or equal to 500 $g/m^2$. In some instances, the second layer (or each of the sub-layers of the second layer) may have a basis weight of less than or equal to 600 $g/m^2$, less than or equal to 500 $g/m^2$, less than or equal to 400 $g/m^2$, less than or equal to 300 $g/m^2$, less than or equal to 200 $g/m^2$, less than or equal to 100 $g/m^2$, less than or equal to 90 $g/m^2$, less than or equal to 85 $g/m^2$, less than or equal to 80 $g/m^2$, less than or equal to 70 $g/m^2$, less than or equal to 60 $g/m^2$, less than or equal to 50 $g/m^2$, less than or equal to 40 $g/m^2$, or less than or equal to 30 $g/m^2$. Combinations of the above-referenced ranges are also possible (e.g., a basis weight of greater than or equal to 20 $g/m^2$ and less than or equal to 600 $g/m^2$, a basis weight of greater than or equal to 50 $g/m^2$ and less than or equal to 300 $g/m^2$, a basis weight of greater than or equal to 50 $g/m^2$ and less than or equal to 200 $g/m^2$, a basis weight of greater than or equal to 30 $g/m^2$ and less than or equal to 85 $g/m^2$). Other values of basis weight are also possible. The basis weight may be determined as described above. In one particular set of embodiments, the second layer has a basis weight of greater than or equal to 30 $g/m^2$ and less than or equal to 85 $g/m^2$.

In some embodiments, the second layer (or each of the sub-layers of the second layer) may have a solidity of greater than or equal to 0.1%, greater than or equal to 0.5%, greater than or equal to 1.0%, greater than or equal to 5.0%, greater than or equal to 10%, greater than or equal to 20%, or greater than or equal to 40%. In certain embodiments, the second layer (or each of the sub-layers of the second layer) may have a solidity of less than or equal to 50%, less than or equal to 40%, less than or equal to 20%, less than or equal to 10%, less than or equal to 5%, less than or equal to 1%, or less than or equal to 0.5%. Combinations of the above-referenced ranges are also possible (e.g., a solidity of greater than or equal to 0.1% and less than or equal to 50%, greater than or equal to 1% and less than or equal to 20%). Other ranges are also possible.

As described herein, in some embodiments, the filter media may be a multi-layered electret-containing media. For instance, a layer (e.g., a second layer) of the media may be charged. In general, the net charge of the layer (e.g., second layer) may be negative or positive. In some instances, at least a surface of the second layer may comprise a negatively charged material and/or a positively charged material.

In some embodiments, the polymers in the second layer (e.g., the first polymer and the second polymer) may be selected based on their dielectric constant and/or position on the triboelectric series, as described herein. For example, in some embodiments the second layer is formed via a carding process (e.g., where the fibers are manipulated by rollers and extensions (e.g., hooks, needles)). The polymer fibers within the second layer with a significant difference in dielectric constant and/or that are relatively far apart on the triboelectric series may undergo contact electrification as a result of the carding process to produce a charged non-woven web. Charged non-woven webs may have enhanced performance properties, including an increased efficiency, compared to a similar non-woven web that is uncharged, all other factors being equal.

In other embodiments, a layer may be neutral (e.g., have no net charge).

Advantageously, the filter media described herein may have a relatively low pressure drop (i.e., resistance) and/or a relatively long lifetime as compared to certain existing filter media. Without wishing to be bound by theory, the filter media may have a decrease in resistance (e.g., initial resistance) when the media includes at least two layers, wherein the ratio of the value of thickness over instantaneous resistance of the second layer to the value of thickness over instantaneous resistance of the first layer (i.e., a TRF ratio) is less than or equal 20. In some embodiments, the media passes a P95 filter media test as described in more detail below.

In some embodiments, the filter media described herein may have a relatively low pressure drop (i.e., resistance) as compared to certain existing filter media when the media includes at least two layers and the ratio of the value of basis weight over air permeability of the first layer to the value of the basis weight over air permeability of the second layer less than or equal to 5 (e.g., less than or equal to 4).

In some embodiments, the filter media may have a ratio of the value of basis weight over air permeability of the first layer to the value of basis weight over air permeability of the second layer (WOA ratio) of less than or equal to 5, less than or equal to 4, less than or equal to 3, less than or equal to 2, less than or equal to 1, less than or equal to 0.5, less than or equal to 0.25, less than or equal to 0.2, less than or equal to 0.1, less than or equal to 0.05, or less than or equal to 0.02. In certain embodiments, the filter media may have a ratio of the value of basis weight over air permeability of the first layer to the value of basis weight over air permeability of the second layer of greater than or equal to 0.01, greater than or equal to 0.02, greater than or equal to 0.05, greater than or equal to 0.1, greater than or equal to 0.2, greater than or equal to 0.25, greater than or equal to 0.5, greater than or equal to 1, greater than or equal to 2, greater than or equal to 3, or greater than or equal to 4. Combinations of the above referenced ranges are also possible (e.g., greater than or equal to 0.01 and less than or equal to 5, greater than or equal to 0.02 and less than or equal to 3). Other ranges are also possible.

In some embodiments, the filter media may have a particular composite air permeability. Composite air permeability, as used herein, refers to the total air permeability of a filter media comprising at least a first layer and a second layer, and is measured according to the ASTM D737 test described herein. In some embodiments, the composite air permeability of the filter media is greater than or equal to 200 CFM, greater than or equal to 250 CFM, greater than or equal to 300 CFM, greater than or equal to 350 CFM, greater than or equal to 400 CFM, greater than or equal to 450 CFM, greater than or equal to 500 CFM, or greater than or equal to 550 CFM. In certain embodiments, the composite air permeability of the filter media is less than or equal to 600 CFM, less than or equal to 550 CFM, less than or equal to 500 CFM, less than or equal to 450 CFM, less than or equal to 400 CFM, less than or equal to 350 CFM, less than or equal to 300 CFM, or less than or equal to 250 CFM. Combinations of the above referenced ranges are also possible (e.g., greater than or equal to 200 CFM and less than or equal to 600 CFM). Other ranges are also possible.

In certain embodiments, a filter media described herein may have a particular final E1 efficiency (e.g., a final E1 efficiency of greater than or equal to 36%), according to the ASHRAE 52.2 standard. In some embodiments, the final E1 efficiency of the filter media is greater than or equal to 36%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, greater than or equal to 99.5%, greater than or equal to 99.8%, greater than or equal to 99.9%, or greater than or equal to 99.99%. In some embodiments, the final E1 efficiency of the filter media is less than or equal to 100%, less than or equal to 99.99%, less than or equal to 99.9%, less than or equal to 99.8%, less than or equal to 99.5%, less than or equal to 99%, less than or equal to 98%, less than or equal to 95%, less than or equal to 90%, less than or equal to 80%, less than or equal to 70%, less than or equal to 60%, less than or equal to 50%, or less than or equal to 40%. Combinations of the above-referenced ranges are also possible (e.g., a final E1 efficiency of greater than or equal to 36% and less than or equal to 100%, greater than or equal to 36% and less than or equal to 90%). Other ranges are also possible. Briefly, the ASHRAE 52.2 test used herein involves a test air flow rate of 295 feet per minute (FPM) where the final pressure drop when the efficiency is measured is 1.5 inches of $H_2O$ on a column. The test is run at an air temperature of 20° C., a relative humidity of 40%, and a barometric pressure of 29.30 in Hg. Test conditions needs to be modified slightly as below. The testing uses a challenge aerosol of atomized KCl particles having a range of particle sizes between 0.3-1.0 microns (for determining E1 final efficiency), 1.0-3.0 microns (for determining E2 final efficiency), and/or 3.0-10.0 microns (for determining E3 final efficiency). The final E1 efficiency is determined by calculating the average minimum particle size efficiency for four ranges of particle sizes within the 0.3-1.0 micron particle size range: 0.3-0.4 micron particle size, 0.4-0.55 micron particle size, 0.55-0.7 micron particle size, 0.7-1.0 micron particle size, i.e., according to the following equation:

Final E1 efficiency=[(minPSE@(0.3-0.4 micron particle size)+minPSE@(0.4-0.55 micron particle size)+minPSE@(0.55-0.7 micron particle size)+minPSE@(0.7-1.0 micron particle size)]/4, where minPSE@(x-y micron particle size) is the minimum particle size efficiency for particles having a given x-y micron particle size range (e.g., 0.3-0.4 micron particle size particles).

Particle size efficiency (PSE) is determined by the following equation:

PSE=(1−(downstream particle concentration/upstream particle concentration))*100.

In certain embodiments, a filter media described herein may have a particular final E2 efficiency (e.g., a final E2 efficiency of greater than or equal to 80%), according to the ASHRAE 52.2 standard. In some embodiments, the final E2 efficiency of the filter media is greater than or equal to 80%, greater than or equal to 90%, greater than or equal to 95%, greater than or equal to 98%, greater than or equal to 99%, greater than or equal to 99.5%, or greater than or equal to 99.8%. In some embodiments, the final E2 efficiency of the filter media is less than or equal to 99.9%, less than or equal to 99.8%, less than or equal to 99.5%, less than or equal to 99%, less than or equal to 98%, less than or equal to 95%, or less than or equal to 90%. Combinations of the above-referenced ranges are also possible (e.g., a final E2 efficiency of greater than or equal to 80% and less than or equal to 100%, greater than or equal to 80% and less than or equal to 90%). Other ranges are also possible.

The final E2 efficiency is determined by calculating the average minimum particle size removal efficiency for four ranges of particle sizes within the 1.0-3.0 micron particle size range: 1.0-1.3 micron particle size, 1.3-1.6 micron particle size, 1.6-2.2 micron particle size, 2.2-3.0 micron particle size, i.e., according to the following equation:

Final E2 efficiency=[(minPSE@(1.0-1.3 micron particle size)+minPSE@(1.3-1.6 micron particle size)+minPSE@(1.6-2.2 micron particle size)+minPSE@(2.2-3.0 micron particle size)]/4, where minPSE@(x-y micron particle size) is the minimum particle size efficiency for particles having a given x-y micron particle size range (e.g., 1.0-3.0 micron particle size particles).

In some embodiments, a filter media described herein may have a particular final E3 efficiency (e.g., a final E3 efficiency of greater than or equal to 90%), according to the ASHRAE 52.2 standard. In some embodiments, the final E3 efficiency of the filter media is greater than or equal to 90%, greater than or equal to 95%, greater than or equal to 98%, greater than or equal to 99%, greater than or equal to 99.5%, or greater than or equal to 99.8%. In some embodiments, the final E3 efficiency of the filter media is less than or equal to 99.9%, less than or equal to 99.8%, less than or equal to 99.5%, less than or equal to 99%, less than or equal to 98%, or less than or equal to 95%. Combinations of the above-referenced ranges are also possible (e.g., a final E3 efficiency of greater than or equal to 90% and less than or equal to 100%). Other ranges are also possible.

The final E3 efficiency is determined by calculating the average minimum particle size removal efficiency for four ranges of particle sizes within the 3.0-10.0 micron particle size range: 3.0-4.0 micron particle size, 4.0-5.5 micron particle size, 5.5-7.0 micron particle size, 7.0-10.0 micron particle size, i.e., according to the following equation:

Final E3 efficiency=[(minPSE@(3.0-4.0 micron particle size)+minPSE@(4.0-5.5 micron particle size)+minPSE@(5.5-7.0 micron particle size)+minPSE@(7.0-10.0 micron particle size)]/4, where minPSE@(x-y micron particle size) is the minimum particle size efficiency for particles having a given x-y micron particle size range (e.g., 3.0-10.0 micron particle size particles).

In some embodiments, the filter media may have a ratio of the value of thickness over instantaneous resistance of the second layer to the value of thickness over instantaneous resistance of the first layer of less than or equal to 20, less than or equal to 15, less than or equal to 10, less than or equal to 5, less than or equal to 3, less than or equal to 2, or less than or equal to 1. In certain embodiments, the filter media may have a ratio of the value of thickness over instantaneous resistance of the second layer to the value of thickness over instantaneous resistance of the first layer of greater than or equal to 0.5, greater than or equal to 1, greater than or equal to 2, greater than or equal to 3, greater than or equal to 5, greater than or equal to 10, or greater than or equal to 15. In some such embodiments, the value of the thickness over instantaneous resistance of the second layer is greater than the value of the thickness over instantaneous resistance of the first layer (e.g., such that the ratio of the value of thickness over instantaneous resistance of the second layer to the value of thickness over instantaneous resistance of the first layer is greater than 1). Combinations of the above-referenced ranges are also possible (e.g., greater than or equal to 0.5 and less than or equal to 20, greater than or equal to 1 and less than or equal to 10). Other ranges are also possible.

In some embodiments, a filter media described herein (e.g., comprising a first layer and a second layer) passes a P95 filter media test performed according to the NIOSH P-95 standard (NIOSH TEB-APR-STP-0053 (Revision 2.0)). Briefly, for a filter media to pass a P95 test, the maximum penetration during 200 mg loading of DOP should not exceed 5%, and the bandwidth of the filter media, defined as the penetration difference at 26 minutes and 30 minutes of the penetration test, should not exceed 0.1%. Maximum penetration and bandwidth are described in more detail below. For example, in some embodiments, the filter media having a TRF ratio within one or more ranges described above (e.g., a TRF ratio of less than or equal to 20) may pass a P95 test. However, in other embodiments, the filter media having a TRF ratio within one or more ranges described above (e.g., a TRF ratio of less than or equal to 20) may pass a P99 test or a P100 test as described herein.

In another embodiment, a filter media described herein (e.g., comprising a first layer and a second layer) passes a P99 filter media test performed according to the NIOSH P-99 standard (NIOSH TEB-APR-STP-0052 (Revision 2.0)). Briefly, for a filter media to pass a P99 test, the maximum penetration during 200 mg loading of DOP should not exceed 1% and the bandwidth of the filter media, defined as the penetration difference at 26 minutes and 30 minutes of the penetration test, should not exceed 0.023%.

In yet another embodiment, the filter media comprising a first layer and a second layer passes a P100 filter media test performed according to the NIOSH P-100 standard (NIOSH TEB-APR-STP-0051 (Revision 2.0)). Briefly, for a filter media to pass a P100 test, the maximum penetration during 200 mg loading of DOP should not exceed 0.03% and the bandwidth of the filter media, defined as the penetration difference at 26 minutes and 30 minutes, should not exceed 0.004%.

In some embodiments, a filter media may have a ratio of the value of thickness over instantaneous resistance of the second layer to the value of thickness over instantaneous resistance of the first layer of less than or equal to 50, less than or equal to 40, less than or equal to 30, less than or equal to 20, less than or equal to 15, less than or equal to 10, less than or equal to 5, less than or equal to 3, less than or equal to 2, or less than or equal to 1. In certain embodiments, the filter media may have a ratio of the value of thickness over instantaneous resistance of the second layer to the value of thickness over instantaneous resistance of the first layer of greater than or equal to 0.5, greater than or equal to 1, greater than or equal to 2, greater than or equal to 3, greater than or equal to 5, greater than or equal to 10, greater than or equal to 15, greater than or equal to 20, greater than or equal to 30, or greater than or equal to 40. Combinations of the above-referenced ranges are also possible (e.g., greater than or equal to 0.5 and less than or equal to 50, greater than or equal to 1 and less than or equal to 30). Other ranges are also possible.

In some embodiments, the filter media having a TRF ratio within one or more ranges described above (e.g., a TRF ratio of less than or equal to 50) may pass a P99 test or a P100 test; however, other configurations are also possible.

In one set of embodiments, a filter media comprises a first layer comprising a plurality of fibers and a second layer adjacent the first layer. The first layer comprises a fluorinated species. The first layer has a first value of a thickness over instantaneous resistance of the first layer, the second layer has a second value of a thickness over instantaneous resistance of the second layer, and the ratio of the second value to the first value is less than or equal to 20. The filter media has an initial efficiency of greater than or equal to 95%.

In an exemplary embodiment, a filter media comprises a first layer (e.g., a meltblown layer) comprising a plurality of meltblown fibers and a fluorinated species (e.g., a fluorinated species having the formula $—C_nF_{2n+1}$, $—C_nF_m$, or $C_nF_m—(C_xH_y)—Z$, where n is an integer equal or greater than 1 and less than or equal to 11, m is an integer equal or greater than 1 and less than or equal to 14, x is an integer greater than 0 and less than or equal to 12, y is an integer greater than 0 and less than or equal to 25, and Z is an end functional group that can be selected from the group consisting of acrylate, methacrylate, alcohol, aldehyde, carboxylic acid, olefins, silane, bromide, iodide, thiol, amine, phenol, isocyanate, sulfonate, epoxide, and ether). The fluorinated species may be deposited onto/into the first layer by a CVD deposition process or another suitable process. The filter media also includes a second layer directly adjacent the first layer. The second layer comprises a first plurality of fibers (e.g., synthetic fibers such as dry spun acrylic fibers) and a second plurality fibers (e.g., synthetic fibers such as polypropylene fibers). In some embodiments, the second layer is a charged layer. Other materials for the first and/or second plurality of fibers may also be used (e.g., two fibers that have a certain difference in dielectric constant as described herein). For example, in some embodiments the first polymer and the second polymer have a difference in dielectric constants of at least about 0.8.

In another exemplary embodiment, a filter media comprises a first layer comprising at least three meltblown sublayers, each sublayer comprising a plurality of meltblown fibers and a fluorinated species (e.g., a fluorinated species having the formula $—C_nF_{2n+1}$, $—C_nF_m$, or $C_nF_m—(C_xH_y)—Z$, where n is an integer equal or greater than 1 and less than or equal to 11, m is an integer equal or greater than 1 and less than or equal to 14, x is an integer greater than 0 and less than or equal to 12, y is an integer greater than 0 and less than or equal to 25, and Z is an end functional group that can be selected from the group consisting of acrylate, methacrylate, alcohol, aldehyde, carboxylic acid, olefins, silane, bromide, iodide, thiol, amine, phenol, isocyanate, sulfonate, epoxide, and ether). The filter media also includes a second layer directly adjacent the first layer, the second layer comprising at least two sublayers. Each sublayer may comprise a first plurality of fibers (e.g., synthetic fibers such as dry spun acrylic fibers) and a second plurality of fibers (e.g., synthetic fibers such as polypropylene fibers). Other materials for the first and/or second plurality of fibers may also be used (e.g., two fibers that have a certain difference in dielectric constant as described herein). For example, in some embodiments the first polymer and the second polymer have a difference in dielectric constants of at least about 0.8. The second layer may be charged.

In yet another exemplary embodiment, a filter media comprises a first layer comprises at least two meltblown sublayers, each sublayer comprising a plurality of meltblown fibers and a fluorinated species (e.g., a fluorinated species having the formula $—C_nF_{2n+1}$, $—C_nF_m$, or $C_nF_m—(C_xH_y)—Z$, where n is an integer equal or greater than 1 and less than or equal to 11, m is an integer equal or greater than 1 and less than or equal to 14, x is an integer greater than 0 and less than or equal to 12, y is an integer greater than 0 and less than or equal to 25, and Z is an end functional group that can be selected from the group consisting of acrylate, methacrylate, alcohol, aldehyde, carboxylic acid, olefins, silane, bromide, iodide, thiol, amine, phenol, isocyanate, sulfonate, epoxide, and ether). The filter media also includes a second layer directly adjacent the first layer.

In some embodiments, the second layer may comprise a first plurality of fibers (e.g., synthetic fibers) and a second plurality of fibers (e.g., synthetic fibers), wherein the first and second plurality of fibers are different. In some embodiments the first polymer and the second polymer have a difference in dielectric constants of at least about 0.8. The second layer may be charged.

Figure 5:
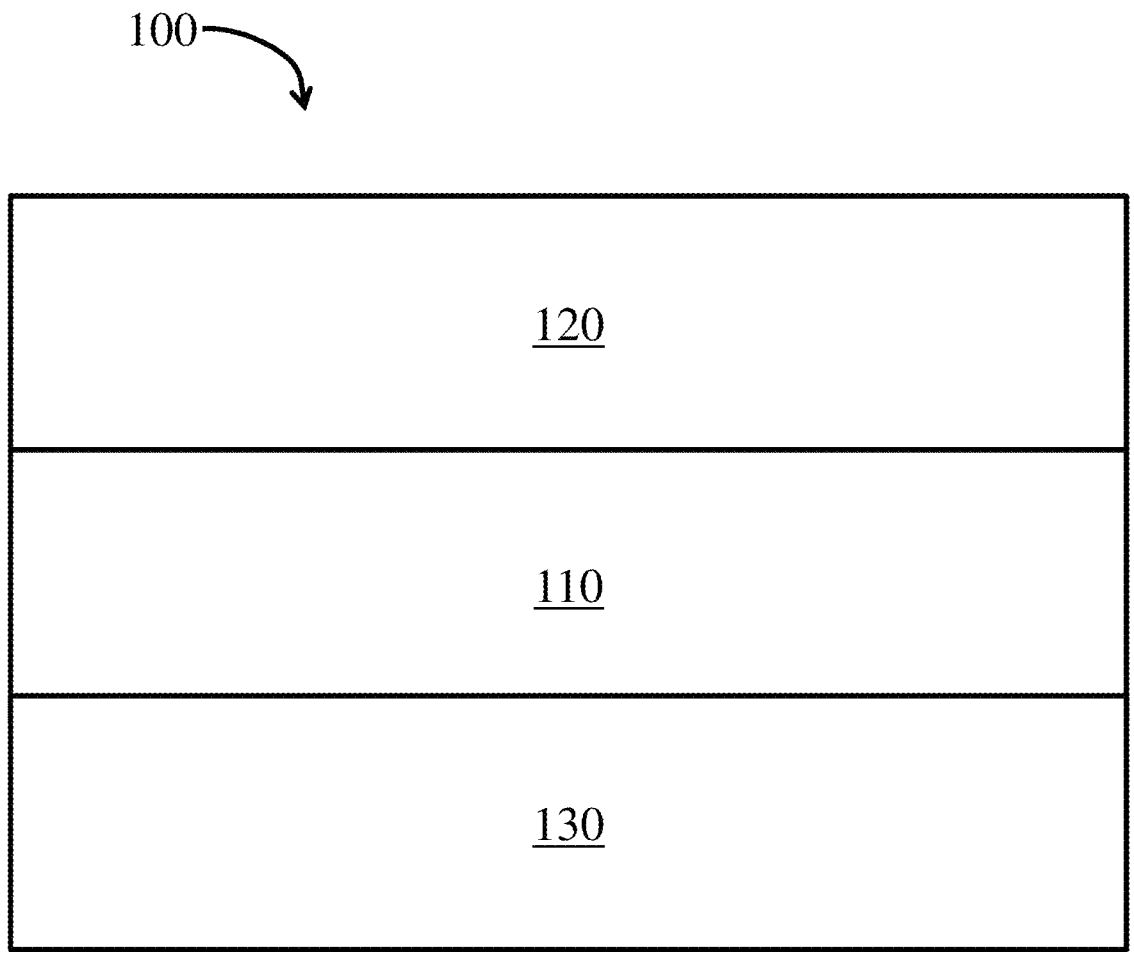
FIG. 5 is a schematic diagram showing a cross-section of a filter media according to one set of embodiments.

In some embodiments, the filter media further comprises one or more support layers (e.g., a meltblown layer, a spunbond layer, a wet-laid layer, a dry-laid layer). For example, referring now to FIG. 5, in some embodiments, filter media 100 comprises a first layer 110, a second layer 120, and a support layer 130 (e.g., a third layer). As shown illustratively in FIG. 5, the first layer may be adjacent the second layer, although other configurations are also possible. Moreover, while the support layer (e.g., the third layer) is illustrated as being adjacent the first layer in FIG. 5, those skilled in the art would understand, based upon the teachings of this specification, that the support layer may be adjacent the second layer or disposed between the first layer and the second layer.

The support layer may be attached to the first layer to provide support for the first layer, and/or may be attached to the second layer to provide support for the second layer. In some cases, a support layer is positioned between the first layer and the second layer. In an exemplary embodiment, the second layer (e.g., a charged layer) is upstream of the first layer (e.g., a non-wet laid layer) and the support layer (e.g., a third layer) is disposed between the first layer and the second layer. In another exemplary embodiment, the second layer (e.g., a charged layer) is upstream of the first layer (e.g., a non-wet laid layer) and the support layer (e.g., a third layer) is adjacent to and downstream of the first layer. In yet another exemplary embodiment, the second layer (e.g., a charged layer) is upstream of the first layer (e.g., a non-wet laid layer) and the support layer (e.g., a third layer) is adjacent to and upstream of the second layer. In yet another exemplary embodiment, the second layer (e.g., a charged layer) is disposed between the first layer and the support layer (e.g., a third layer). Other arrangements and combinations are also possible.

Those skilled in the art would understand that such a support layer is a separate layer and is not included in the calculation of the value of thickness over instantaneous resistance for the first layer or the second layer, nor included into the calculation of the values of basis weight over air permeability for the first layer or the second layer.

The support layer(s) may be formed of a different fiber type (including a different fiber composition/materials) than fibers of the first layer and/or fibers of second layer. In some embodiments, the one or more support layers comprise a plurality of spunbond fibers, wetlaid fibers, drylaid fibers and/or meltblown fibers. In some embodiments, if part of the first layer, the support layer (e.g., spunbond layer) may be coated (e.g., with a fluorinated species) as described herein. In some embodiments, if part of the second layer, the support layer (e.g., spunbond layer) may be needled to the second layer. In some cases, the support layer aids in fabrication and/or manipulation of the layer(s), but is removed from the first and/or second layer prior to incorporation of the layer(s) into a filter media and/or a filter element. However, in other embodiments the support layer(s) may be present in the final filter media and/or a filter element.

In certain embodiments, the support layer comprises a plurality of fibers comprising a polymer. Non-limiting examples of suitable polymers for the support layer include polypropylene, high density polyethylene, low density polyethylene, linear low density polyethylene, ethylene-vinyl acetate, polyamide, polyurethane, polyethylene terephthalate, polylactic acid, and copolymers thereof. In some embodiments, a single fiber composition is used to form the support layer.

In some embodiments, the support layer may be designed to have a particular air permeability. In some embodiments, the air permeability of the support layer is greater than or equal to 1100 CFM, greater than or equal to 1500 CFM, greater than or equal to 2000 CFM, greater than or equal to 3000 CFM, greater than or equal to 4000 CFM, greater than or equal to 5000 CFM, greater than or equal to 6000 CFM, greater than or equal to 7000 CFM, greater than or equal to 8000 CFM, or greater than or equal to 9000 CFM. In certain embodiments, the air permeability of the support layer is less than or equal to 10000 CFM, less than or equal to 9000 CFM, less than or equal to 8000 CFM, less than or equal to 7000 CFM, less than or equal to 6000 CFM, less than or equal to 5000 CFM, less than or equal to 4000 CFM, less than or equal to 3000 CFM, less than or equal to 2000, or less than or equal to 1500 CFM. Combinations of the above referenced ranges are also possible (e.g., greater than or equal to 1100 CFM and less than or equal to 10000 CFM). Other ranges are also possible. In certain embodiments, the support layer may have a particular basis weight. In some embodiments, the basis weight of the support layer may be greater than or equal to 0.5 $g/m^2$, greater than or equal to 1 $g/m^2$, greater than or equal to 2 $g/m^2$, greater than or equal to 5 $g/m^2$, greater than or equal to 10 $g/m^2$, greater than or equal to 20 $g/m^2$, greater than or equal to 50 $g/m^2$, or greater than or equal to 100 $g/m^2$. In some embodiments, the basis weight of the support layer is less than or equal to 150 $g/m^2$, less than or equal to 100 $g/m^2$, less than or equal to 50 $g/m^2$, less than or equal to 20 $g/m^2$, less than or equal to 10 $g/m^2$, less than or equal to 5 $g/m^2$, less than or equal to 2 $g/m^2$, or less than or equal to 1 $g/m^2$. Combinations of the above-referenced ranges are also possible (e.g., greater than or equal to 0.5 $g/m^2$ and less than or equal to 150 $g/m^2$, greater than or equal to 2 $g/m^2$ and less than or equal to 50 $g/m^2$). Other ranges are also possible.

In some embodiments, a filter media comprises a first layer comprising a plurality of fibers and a second layer adjacent the first layer. In some such embodiments, the first layer and the second layer may be mated to one another using various techniques in the art. For example, in some embodiments, the first layer and the second layer may be mated by needling. In certain embodiments in which the filter media further comprises a support layer (e.g., a third layer), the first layer, second layer, and support layer may be mated to one another by needling. In some such embodiments, the filter media does not comprise an adhesive and/or an adhesive layer, or is substantially free of adhesive.

In certain embodiments, the filter media may have a particular needle density (e.g., greater than or equal to 10 needle punches per square inch (PPSI)). In some embodiments, the needle density of the filter media is between 10 PPSI and 30 PPSI. For example, in certain embodiments, the needle density of the filter media is greater than or equal to 10 PPSI, greater than or equal to 12 PPSI, greater than or equal to 15 PPSI, greater than or equal to 17 PPSI, greater than or equal to 20 PPSI, or greater than or equal to 25 PPSI. In certain embodiments, the needle density of the filter media is less than or equal to 30 PPSI, less than or equal to 25 PPSI, less than or equal to 20 PPSI, less than or equal to 17 PPSI, less than or equal to 15 PPSI, or less than or equal to 12 PPSI. Combinations of the above referenced ranges are also possible (e.g., greater than or equal to 10 PPSI and less than or equal to 30 PPSI). Other ranges are also possible.

In one set of embodiments, a filter media comprises a first layer comprising a plurality of fibers and a second layer adjacent the first layer. The first layer has a first value of a thickness over instantaneous resistance of the first layer, the second layer has a second value of a thickness over instantaneous resistance of the second layer, and the ratio of the second value to the first value is less than or equal to 20. The filter media has an initial efficiency of greater than or equal to 95%.

In another set of embodiments, a filter media comprises a first layer comprising a plurality of fibers and a second layer. In some instances, the first layer is adjacent the second layer. The second layer is charged. The first layer has a first value of a basis weight over air permeability of the first layer, the second layer has a second value of a basis weight over air permeability of the second layer, and the ratio of the first value to the second value (WOA ratio) is less than or equal to 5 (e.g., less than or equal to 4). The filter media has an final E1 efficiency of greater than or equal to 36%. In some embodiments, such a media has a first layer having a basis weight of less than or equal to 20 $g/m^2$ and a plurality of fibers having an average fiber diameter of greater than or equal to 1 micron and less than or equal to 8 microns. In certain embodiments, the second layer has a basis weight of greater than or equal to 30 $g/m^2$ and less than or equal to 85 $g/m^2$.

In some embodiments, the filter media having the WOA ratio of less than or equal to 5 (e.g., less than or equal to 4) has an initial resistance of less than or equal to 1.6 mm $H_2O$ (or another suitable range described herein). In some such embodiments, the first layer may have air permeability of greater than or equal to 200 CFM and less than or equal to 650 CFM. The first layer may comprise two or more sublayers and/or may be a non-wet laid layer. In some cases, the first layer comprises a plurality of meltblown fibers, meltspun fibers, melt electrospun fibers, solvent electrospun fibers, centrifugal spun fibers, spunbond fibers, and/or combinations thereof. In some embodiments, the second layer has an air permeability of greater than or equal to 330 CFM and less than or equal to 1000 CFM. The second layer may comprise two or more sublayers and/or may comprise a first plurality of fibers comprising a first polymer and a second plurality of fibers comprising a second polymer (wherein the first and second polymers are different). In some instances, the first polymer may comprise acrylic (e.g., dry spun acrylic) and the second polymer may comprise polypropylene. The second layer may be positioned upstream relative to the first layer or in any other suitable configuration described herein.

In some cases, the filter media comprises a support layer having an air permeability of greater than or equal to 1100 CFM and less than or equal to 10000 CFM. In certain embodiments, the filter media may be needled and/or does not comprise an adhesive or adhesive layer, or is substantially free of adhesive. The filter media may have a final E1 efficiency of greater than or equal to 36%, according to the ASHRAE 52.2 standard described herein.

In some embodiments, a filter element comprises a filter media described herein. Such filter elements may be used, for example, in an HVAC filter.

In certain embodiments, including the filter media described above and herein, the first layer does not include a fluorinated species and is not charged. However, in other embodiments, the first layer may include a fluorinated species as described herein.

In certain embodiments, including the filter media described above and herein, the first layer has a value of basis weight over air permeability of the first layer of greater than or equal to 0.000125 g/m$^2$CFM and less than or equal to 0.2 g/m$^2$CFM (or another suitable range described herein), and the second layer has a value of basis weight over air permeability of the second layer of greater than or equal to 0.03 g/m$^2$CFM and less than or equal to 0.25 g/m$^2$CFM (or another suitable range described herein). In some embodiments, the first layer has a first value of a basis weight over air permeability of the first layer and the second layer has a second value of a basis weight over air permeability of the second layer, such that the ratio of the first value to the second value is less than or equal to 5 (or another suitable range described herein, e.g., less than or equal to 4).

In certain embodiments, including the filter media described above and herein, the first layer has a value of thickness over instantaneous resistance of the first layer of greater than or equal to 2 mils/mmH$_2$O and less than or equal to 50 mils/mm H$_2$O (or another suitable range described herein), and the second layer has a value of thickness over instantaneous resistance of the second layer of greater than or equal to 20 mils/mmH$_2$O and less than or equal to 150 mils/mm H$_2$O (or another suitable range described herein). In some embodiments, the first layer has a first value of a thickness over instantaneous resistance of the first layer and the second layer has a second value of a thickness over instantaneous resistance of the second layer, such that the ratio of the second value to the first value is less than or equal to 20 (or another suitable range described herein).

In certain embodiments, including the filter media described above and herein, the basis weight of the first layer is greater than or equal to 0.1 g/m$^2$ and less than or equal to 500 g/m$^2$ (e.g., greater than or equal to 6 g/m$^2$ and less than or equal to 80 g/m$^2$) and/or the basis weight of the second layer is greater than or equal to 20 g/m$^2$ and less than or equal to 600 g/m$^2$ (e.g., greater than or equal to 50 g/m$^2$ and less than or equal to 200 g/m$^2$).

In certain embodiments, including the filter media described above and herein, the basis weight of the first layer is less than or equal to 20 g/m$^2$ and/or the basis weight of the second layer is greater than or equal to 30 g/m$^2$ and less than or equal to 85 g/m$^2$.

In some embodiments, including the filter media described above and herein, the first plurality of fibers comprises a first polymer and the second plurality of fibers comprises a second polymer where the first polymer and the second polymer have a difference in dielectric constants of at least about 0.8.

In some embodiments, the filter media may be designed to have a particular ratio of the solidity of the first layer to the solidity of the second layer. In certain embodiments, the ratio of the solidity of the first layer to the solidity of the second layer is greater than or equal to 0.1, greater than or equal to 0.5, greater than or equal to 1, greater than or equal to 2, greater than or equal to 5, greater than or equal to 10, or greater than or equal to 20. In some cases, the ratio of the solidity of the first layer to the solidity of the second layer may be less than or equal to 25, less than or equal to 20, less than or equal to 10, less than or equal to 5, less than or equal to 2, less than or equal to 1, or less than or equal to 0.5. Combinations of the above-referenced ranges are also possible (e.g., greater than or equal to 0.1 and less than or equal to 25, greater than or equal to 1 and less than or equal to 5). Other ranges are also possible.

In certain embodiments, the total thickness of the filter media (e.g., the filter media comprising the first layer and the second layer) may be greater than or equal to 30 mils, greater than or equal to 40 mils, greater than or equal to 50 mils, greater than or equal to 75 mils, greater than or equal to 100 mils, greater than or equal to 150 mils, greater than or equal to 200 mils, greater than or equal to 250 mils, greater than or equal to 300 mils, greater than or equal to 500 mils, or greater than or equal to 750 mils. In some embodiments, the total thickness of the filter media is less than or equal to 1000 mils, less than or equal to 750 mils, less than or equal to 500 mils, less than or equal to 300 mils, less than or equal to 250 mils, less than or equal to 200 mils, less than or equal to 150 mils, less than or equal to 100 mils, less than or equal to 75 mils, less than or equal to 50 mils, or less than or equal to 40 mils. Combinations of the above-referenced ranges are also possible (e.g., greater than or equal to 30 mils and less than or equal to 1000 mils, greater than or equal to 30 mils and less than or equal to 300 mils, greater than or equal to 50 mils and less than or equal to 200 mils). Other ranges are also possible. Total thickness, as described herein, is measured using a Federal C&R thickness gauge according to the standard ASTM D1778. Briefly, the gauge has 1 square inch area in contact with the filter media and uses a 2 ounce load to lightly compress the sample as follows: the gauge is zeroed first without the filter media, then raised to allow enough space to insert the filter media, then lowered again to rest on the filter media without impact. The total thickness is noted on the dial.

As described herein, a filter media and/or a layer (e.g., a first layer, a second layer) may be designed to have a particular resistance (e.g., instantaneous resistance, initial resistance), penetration (e.g., instantaneous penetration, initial penetration, maximum penetration, bandwidth) or efficiency (e.g., instantaneous efficiency, initial efficiency). Resistance, penetration and efficiency are measured using a 8130 CertiTest™ automated filter testing unit from TSI, Inc. equipped with a DiOctyl Phthalate (DOP) generator for DOP aerosol testing based on the NIOSH P-series standard (e.g., NIOSH TEB-APR-STP-0053 (Revision 2.0)) for DOP particles. The particle size created by the DOP particle generator is 0.3 microns (mass mean diameter). The test involves using a DOP particle concentration in an air stream of about 125 mg/m$^3$, for a continuous 30 minute challenge to accumulate 200 mg loading at a face velocity 16.4 FPM over a 100 cm$^2$ face area of the filter media/layer. The TSI 8130 CertiTest™ can record measurements at the beginning of the test (time=0) and/or at every minute for the continuous 30 minutes. Instantaneous resistance, instantaneous penetration, and instantaneous efficiency are determined instantaneously upon beginning of the test (e.g., at time=0). Initial resistance, initial penetration, and initial efficiency are determined at 1 minute after starting the test. Maximum penetration corresponds to the maximum penetration measurement during the 30 minute test. Bandwidth is calculated by taking the percentage difference in penetration between measurements obtained at 26 minutes and 30 minutes of the test.

Advantageously, the filter media comprising a first layer and a second layer as described herein may have lower initial resistance compared to certain existing filter media. In some embodiments, the initial resistance of a filter media described herein is less than or equal to 35 mm $H_2O$, less than or equal to 30 mm $H_2O$, less than or equal to 25 mm $H_2O$, less than or equal to 20 mm $H_2O$, less than or equal to 15 mm $H_2O$, less than or equal to 10 mm $H_2O$, less than or equal to 9, less than or equal to 8 mm $H_2O$, less than or equal to 5 mm $H_2O$, less than or equal to 4 mm $H_2O$, less than or equal to 3 mm$H_2O$, less than or equal to 2 mm $H_2O$, less than or equal to 1.6 mm $H_2O$, less than or equal to 1 mm $H_2O$, less than or equal to 0.5 mm $H_2O$, less than or equal to 0.1 mm $H_2O$, or less than or equal to 0.05 mm $H^2O$. In certain embodiments, the initial resistance of the filter media is greater than or equal to 0.01 mm $H_2O$, greater than or equal to 0.05 mm $H_2O$, greater than or equal to 0.1 mm $H_2O$, greater than or equal to 0.5 mm $H_2O$, greater than or equal to 1 mm $H_2O$, greater than or equal to 1.6 mm $H_2O$, greater than or equal to 2 mm $H_2O$, greater than or equal to 4 mm $H_2O$, greater than or equal to 5 mm $H_2O$, greater than or equal to 10 mm $H_2O$, greater than or equal to 15 mm $H_2O$, greater than or equal to 20 mm $H_2O$, greater than or equal to 25 mm $H_2O$, or greater than or equal to 30 mm $H_2O$. Combinations of the above referenced ranges are also possible (e.g., less than or equal to 35 mm $H_2O$ and greater than or equal to 1 mm $H_2O$, less than or equal to 20 mm $H_2O$ and greater than or equal to 4 mm $H_2O$, less than or equal to 1.6 mm $H_2O$ and greater than or equal to 0.01 mm $H_2O$). Other ranges are also possible. In an exemplary embodiment, the filter media (e.g., a filter media that passes a P95 test as described herein) comprising a first layer and a second layer as described herein has an initial resistance of less than 1.6 mm $H_2O$.

As described herein, the filter media and/or layer (e.g., first layer, second layer) may have a particular efficiency and/or penetration. In general, efficiency is determined as 100-% Penetration. Penetration, expressed as a percentage, is defined as Pen=$(C/C_0)*100$, where C is the particle concentration after passage through the filter media and $C_0$ is the particle concentration before passage through the filter media.

In some embodiments, the instantaneous efficiency of the filter media is greater than or equal to 90%, greater than or equal to 92%, greater than or equal to 95%, greater than or equal to 96%, greater than or equal to 97%, greater than or equal to 98%, greater than or equal to 99%, greater than or equal to 99.5%, greater than or equal to 99.8%, greater than or equal to 99.9%, or greater than or equal to 99.99%. In some embodiments, the instantaneous efficiency of the filter media is less than or equal to 100%, less than or equal to 99.99%, less than or equal to 99.9%, less than or equal to 99.8%, less than or equal to 99.5%, less than or equal to 99%, less than or equal to 98%, less than or equal to 97%, less than or equal to 96%, less than or equal to 95%, or less than or equal to 92%. Combinations of the above-referenced ranges are also possible (e.g., an instantaneous efficiency of greater than or equal to 90% and less than or equal to 100%, greater than or equal to 95% and less than or equal to 100%). Other ranges are also possible.

In some embodiments, the initial efficiency of the filter media is greater than or equal to 90%, greater than or equal to 92%, greater than or equal to 95%, greater than or equal to 96%, greater than or equal to 97%, greater than or equal to 98%, greater than or equal to 99%, greater than or equal to 99.5%, greater than or equal to 99.8%, greater than or equal to 99.9%, or greater than or equal to 99.99%. In some embodiments, the initial efficiency of the filter media is less than or equal to 100%, less than or equal to 99.99%, less than or equal to 99.9%, less than or equal to 99.8%, less than or equal to 99.5%, less than or equal to 99%, less than or equal to 98%, less than or equal to 97%, less than or equal to 96%, less than or equal to 95%, or less than or equal to 92%. Combinations of the above-referenced ranges are also possible (e.g., an initial efficiency of greater than or equal to 90% and less than or equal to 100%, greater than or equal to 95% and less than or equal to 100%). Other ranges are also possible.

The filter media described herein may be designed to have a particular range of maximum penetration. In some embodiments, the filter media described herein has a maximum penetration of less than or equal to 10%, less than or equal to 5%, less than or equal to 2%, less than or equal to 1%, less than or equal to 0.5%, or less than or equal to 0.1%. In some embodiments, the filter media has a maximum penetration of greater than or equal to 0%, greater than or equal to 0.1%, greater than or equal to 0.5%, greater than or equal to 1%, greater than or equal to 2%, or greater than or equal to 5%. Combinations of the above-referenced ranges are also possible (e.g., greater than or equal to 0% and less than or equal to 10%, greater than or equal to 0% and less than or equal to 2%).

In certain embodiments, the filter media described herein may have a bandwidth. In general, the bandwidth gives an indication of stability of a filter media's efficiency during extended usage, wherein lower values of bandwidth indicate greater stability of the filter media's efficiency compared to higher values. In some embodiments, the bandwidth of the filter media is less than or equal to 3%, less than or equal to 2%, less than or equal to 1%, less than or equal to 0.5%, less than or equal to 0.1%, less than or equal to 0.05%, less than or equal to 0.023%, less than or equal to 0.005%, or less than or equal to 0.004%. In certain embodiments, the bandwidth of the filter media is greater than or equal to 0%, greater than or equal to 0.004%, greater than or equal to 0.005%, greater than or equal to 0.023%, greater than or equal to 0.05%, greater than or equal to 0.1%, greater than or equal to 0.5%, greater than or equal to 1%, or greater than or equal to 2%. Combinations of the above-referenced ranges are also possible (e.g., less than or equal to 3% and greater than or equal to 0%, less than or equal to 0.1% and greater than or equal to 0.1%). Other ranges are also possible.

The filter media described herein (or any given layer, e.g. first layer, second layer, a sublayer of the first or second layer) may be tailored to have a particular oil repellency level. Such filter media may be used, for example, to remove or coalesce oil, lubricants, and/or cooling agents from a gas stream that passes through the filter media. In some embodiments, the oil repellency level of the filter media or layer or sublayer is between 1 and 7 (e.g., 1-4, 2-5, 3-6, 4-7). In certain embodiments, the oil repellency level of the filter media or layer or sublayer is 1, 2, 3, 4, 5, 6, or 7. Oil repellency level as described herein is determined according to AATCC TM 118 (1997) measured at 23° C. and 50% relative humidity (RH). Briefly, 5 drops of each test oil (having an average droplet diameter of about 2 mm) are placed on five different locations on the surface of the filter media or layer or sublayer. The test oil with the greatest oil surface tension that does not wet (e.g., has a contact angle greater than or equal to 90 degrees with the surface) the surface of the filter media or layer or sublayer after 30 seconds of contact with the filter media at 23° C. and 50% RH, corresponds to the oil repellency level (listed in Table 2). For example, if a test oil with a surface tension of 26.6 mN/m does not wet (i.e., has a contact angle of greater than or equal to 90 degrees with the surface) the surface of the filter media or layer or sublayer after 30 seconds, but a test oil with a surface tension of 25.4 mN/m wets the surface of the filter media or layer or sublayer within thirty seconds, the filter media or layer or sublayer has an oil repellency level of 4. By way of another example, if a test oil with a surface tension of 25.4 mN/m does not wet the surface of the filter media or layer or sublayer after 30 seconds, but a test oil with a surface tension of 23.8 mN/m wets the surface of the filter media or layer or sublayer within thirty seconds, the filter media or layer or sublayer has an oil repellency level of 5. By way of yet another example, if a test oil with a surface tension of 23.8 mN/m does not wet the surface of the filter media or layer or sublayer after 30 seconds, but a test oil with a surface tension of 21.6 mN/m wets the surface of the filter media or layer or sublayer within thirty seconds, the filter media or layer or sublayer has an oil repellency level of 6. In some embodiments, if three or more of the five drops partially wet the surface (e.g., forms a droplet, but not a well-rounded drop on the surface) in a given test, then the oil repellency level is expressed to the nearest 0.5 value determined by subtracting 0.5 from the number of the test liquid. By way of example, if a test oil with a surface tension of 25.4 mN/m does not wet the surface of the filter media or layer or sublayer after 30 seconds, but a test oil with a surface tension of 23.8 mN/m only partially wets the surface of the filter media or layer or sublayer after 30 seconds (e.g., three or more of the test droplets form droplets on the surface of the filter media or layer or sublayer that are not well-rounded droplets) within thirty seconds, the filter media or layer or sublayer has an oil repellency level of 5.5.

TABLE 2

| Oil Repellency Level | Test Oil | Surface tension (in mN/m) |
| --- | --- | --- |
| 1 | Kaydol (mineral oil) | 31 |
| 2 | 65/35 Kaydol/n-hexadecane | 28 |
| 3 | n-hexadecane | 27.5 |
| 4 | n-tetradecane | 26.6 |
| 5 | n-dodecane | 25.4 |
| 6 | n-decane | 23.8 |
| 7 | n-octane | 21.6 |
| 8 | n-heptane | 20.1 |

As described above, in some embodiments, a layer of the filter media (e.g., the first layer or one or more sublayers of the first layer, the second layer or one or more sublayers of the second layer) may be a non-wet laid layer formed using a non-wet laid process (e.g., an air laid process, a carding process, a meltblown process). For example, in a non-wet laid process, an air laid process or a carding process may be used. For example, in an air laid process, fibers may be mixed while air is blown onto a conveyor. In a carding process, in some embodiments, the fibers are manipulated by rollers and extensions (e.g., hooks, needles) associated with the rollers.

In some embodiments, as described herein, a layer of the filter media (e.g., the first layer or one or more of the sublayers of the first layer, the second layer or one or more of the sublayers of the second layer) may include fibers formed from a meltblown process. In embodiments in which the filter media includes a meltblown layer, the meltblown layer may have one or more characteristics described in commonly-owned U.S. Pat. No. 8,608,817, entitled "Meltblown Filter Medium", issued on Dec. 17, 2013, which is based on U.S. patent application Ser. No. 12/266,892 filed on May 14, 2009, commonly-owned U.S. Patent Publication No. 2012/0152824, entitled "Fine Fiber Filter Media and Processes", which is based on patent application Ser. No. 12/971,539 filed on Dec. 17, 2010, commonly-owned U.S. Patent Publication No. 2012/0152824, entitled "Fine Fiber Milter Media and Processes", which is based on patent application Ser. No. 12/971,539 filed on Dec. 17, 2010, and commonly-owned U.S. Patent Publication No. 2012/0152821, entitled "Fine Fiber Milter Media and Processes", which is based on patent application Ser. No. 12/971,594 filed on Dec. 17, 2010, each of which is incorporated herein by reference in its entirety for all purposes.

The filter media may be used for a number of applications, such as respirator and face mask applications, cabin air filtration, military garments, HVAC systems (e.g., for industrial areas and buildings), clean rooms, vacuum filtration, room air cleaning, and respirator protection equipment (e.g., industrial respirators).

In some embodiments, the filter media may be incorporated into a face mask. The filter media can be, for example, folded, edge sealed, collated, or molded, with or without a supporting structure, within the face mask. The face mask may be a full face piece or a half face piece, and may be disposable or reusable. In general, face masks are used to protect the respiratory system when the air contains hazardous amounts of particulate contaminants in the form of solid particles or liquid droplets that can cause impairment through inhalation. Accordingly, a face mask generally needs to provide adequate protection with good breathability (e.g., low resistance). The face mask may be designed to filter dust, fog, fumes, vapors, smoke, sprays or mists. For example, face masks may be worn in areas where activities such as grinding, welding, road paving (e.g., where hot asphalt fumes are present), coal mining, transferring diesel fuel, or pesticide spraying are performed. The face mask may also be designed for wearing in hospitals (e.g., performing surgery), distillers and refineries in chemical industries, painting facilities, or oil fields. For example, the face mask may be a surgical face mask or an industrial face mask.

The filter media may be incorporated into a variety of other suitable filter elements for use in various applications including gas filtration. For example, the filter media may be used in heating and air conditioning ducts. Filter elements may have any suitable configuration as known in the art including bag filters and panel filters. Filter assemblies for filtration applications can include any of a variety of filter media and/or filter elements. The filter elements can include the above-described filter media and/or layers (e.g., first layer, second layer). Examples of filter elements include gas turbine filter elements, dust collector elements, heavy duty air filter elements, automotive air filter elements, air filter elements for large displacement gasoline engines (e.g., SUVs, pickup trucks, trucks), HVAC air filter elements, HEPA filter elements, ULPA filter elements, and vacuum bag filter elements.

Filter elements can be incorporated into corresponding filter systems (gas turbine filter systems, heavy duty air filter systems, automotive air filter systems, HVAC air filter systems (including residential and industrial HVAC air filter systems), HEPA filter systems, ULPA filter system, and vacuum bag filter systems). The filter media can optionally be pleated into any of a variety of configurations (e.g., panel, cylindrical).

Filter elements can also be in any suitable form, such as radial filter elements, panel filter elements, or channel flow elements. A radial filter element can include pleated filter media that are constrained within two open wire support materials in a cylindrical shape.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

As noted above, in some embodiments, the filter media can be incorporated into a bag (or pocket) filter element. A bag filter element may be formed by any suitable method, e.g., by placing two filter media together (or folding a single filter media in half), and mating three sides (or two if folded) to one another such that only one side remains open, thereby forming a pocket inside the filter. In some embodiments, multiple filter pockets may be attached to a frame to form a filter element. It should be understood that the filter media and filter elements may have a variety of different constructions and the particular construction depends on the application in which the filter media and elements are used. In some cases, a substrate may be added to the filter media.

The filter elements may have the same property values as those noted above in connection with the filter media and/or layers. For example, the above-noted instantaneous resistances, efficiencies, (total) thicknesses, and/or basis weight may also be found in filter elements. During use, the filter media mechanically trap contaminant particles on the filter media as fluid (e.g., air) flows through the filter media.

Other systems, devices, and applications are also possible and those skilled in the art would be capable of selecting such systems, devices, and applications based upon the teachings of this specification.

EXAMPLES

Example 1

This example demonstrates the effects of the ratio of a value of thickness over instantaneous resistance of second layer to a value of thickness over instantaneous resistance of first layer on filter media performance.

Samples were prepared as listed in Table 3:

TABLE 3

| Filter Media | 1st Layer with fluorinated species | 2nd Layer |
| --- | --- | --- |
| 1 | 3 sublayers B | 2 sublayers C50 |
| 2* | 1 sublayer C + 2 sublayers D | 2 sublayers C50 |
| 3 | 2 sublayers D | 2 sublayers C100 |
| 4 | 1 sublayer D + 1 sublayer E | 2 sublayers C100 |
| 5 | 1 sublayer E | 1 sublayer C200 |
| 6 | 3 sublayers F | 2 sublayers C100 |
| 7 | 2 sublayers F | 1 sublayer C200 |

*Filter media includes fluorinated SB intervening layer between $1^{st}$ and $2^{nd}$ layers
SB = spunbond, light weight nonwoven polypropylene fiber material as structure reinforcement
B = a meltblown polypropylene fiber layer with basis weight of 20 g/m$^2$ reinforced by a SB layer
C = a fine fiber meltblown polypropylene fiber layer with basis weight of 6 g/m$^2$ reinforced by a SB layer
D = a meltblown polypropylene fiber layer with basis weight of 20 g/m$^2$
E = a meltblown polypropylene fiber layer with basis weight of 20 g/m$^2$ reinforced by a SB layer
F = a meltblown polypropylene layer with basis weight of 80 g/m$^2$
C50, C100, C200 = a charged layer made of polypropylene and acrylic fibers of 50, 100, 200 g/m$^2$ basis weight, respectively Tables 4-5 summarize the various properties of the filter media listed in Table 3. Table 4 summarizes the instantaneous resistance, instantaneous penetration, basis weight, uncompressed thickness, and solidity for the first layer of each filter media listed in Table 3.

TABLE 4

| | $1^{st}$ layer | | | | | |
| --- | --- | --- | --- | --- | --- | --- |
| Filter Media | Instantaneous Resistance (in mm H$_2$O) | Instantaneous Penetration | Basis weight, gsm | Mitutoya Uncompressed Thickness, mil | Solidity | Uncompressed thickness to instantaneous resistance ratio of the $1^{st}$ layer (TRF) |
| 1 | 13.2 | 2.46% | 75 | 46 | 0.082 | 3.5 |
| 2 | 13.5 | 2.17% | 76 | 48 | 0.074 | 3.5 |
| 3 | 8 | 1.28% | 40 | 24 | 0.085 | 3.1 |
| 4 | 8.3 | 1.19% | 55 | 34 | 0.081 | 4.1 |
| 5 | 4 | 11% | 35 | 22 | 0.078 | 5.5 |
| 6 | 5.7 | 1.60% | 240 | 162 | 0.071 | 28.5 |
| 7 | 4.4 | 6.38% | 160 | 108 | 0.071 | 24.6 |

Table 5 summarizes the instantaneous resistance, instantaneous penetration, basis weight, uncompressed thickness, and solidity for the second layer of each filter media listed in Table 3.

TABLE 5

| | 2$^{nd}$ Layer | | | | | |
|---|---|---|---|---|---|---|
| Filter Media | Instantaneous Resistance (in mm H$_2$O) | Instantaneous Penetration | Basis weight, gsm | Mitutoya Un-compressed Thickness, mil | Solidity | Un-compressed thickness to instantaneous resistance ratio of the 2$^{nd}$ layer (TRF) |
| 1 | 1.2 | 15.20% | 100 | 152 | 0.033 | 127 |
| 2 | 1.2 | 15.20% | 100 | 152 | 0.033 | 127 |
| 3 | 2 | 1.77% | 200 | 230 | 0.037 | 115 |
| 4 | 2 | 1.77% | 200 | 230 | 0.037 | 115 |
| 5 | 2.3 | 0.58% | 200 | 132 | 0.064 | 57 |
| 6 | 2 | 1.77% | 200 | 230 | 0.037 | 115 |
| 7 | 2.3 | 0.58% | 200 | 132 | 0.064 | 57 |

Figure 6:
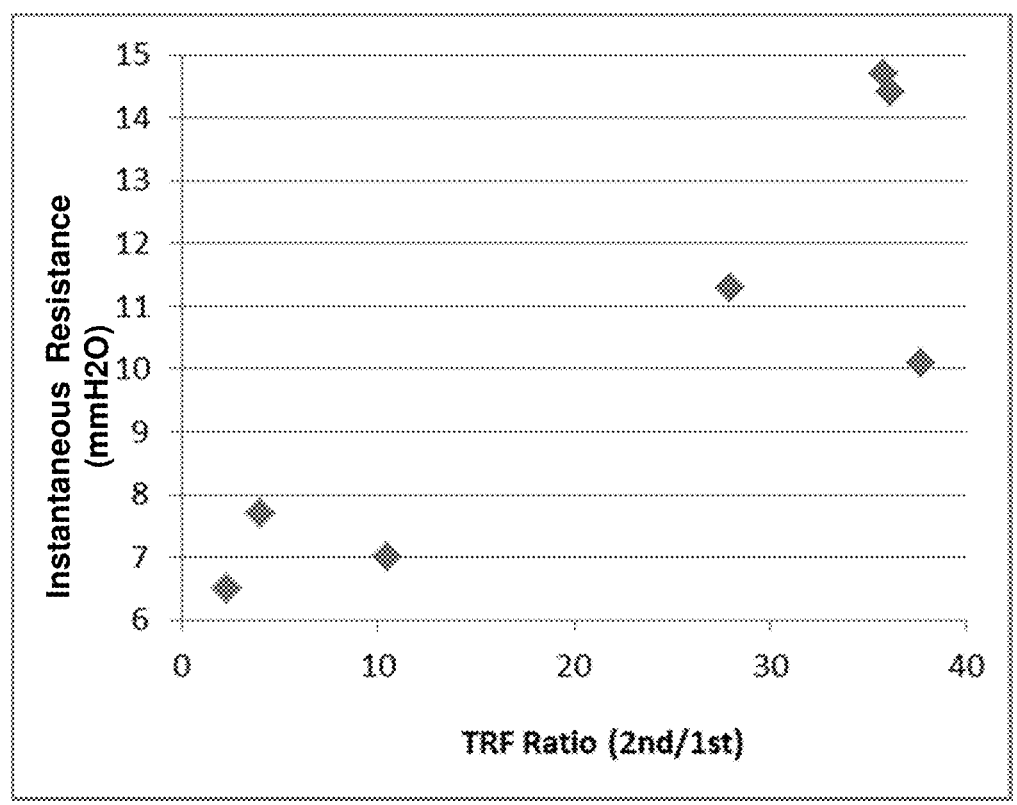
FIG. 6 is a plot of thickness over instantaneous resistance ratio of two layers of a filter media, according to one set of embodiments.

Table 6 summarizes the total thickness, initial resistance, initial penetration, and the ratio of a value of thickness over instantaneous resistance of the second layer to a value of thickness over instantaneous resistance of first layer (TRF ratio), of the filter media listed in Table 3. As shown in Table 6, which is plotted in FIG. 6, filter media samples 5-7, having a TRF ratio of less than or equal to 10 had an instantaneous resistance of less than 10 mm H$_2$O.

TABLE 6

| Filter Media | Total Thickness, mil* | Initial Resistance, mm H$_2$O | Initial penetration | Ratio of the value of thickness over instantaneous resistance of second layer to the value of thickness over instantaneous resistance of first layer |
|---|---|---|---|---|
| 1 | 136 | 14.4 | 0.37% | 36 |
| 2 | 140 | 14.7 | 0.33% | 36 |
| 3 | 189 | 10.1 | 0.05% | 38 |
| 4 | 200 | 11.3 | 0.04% | 28 |
| 5 | 142 | 7 | 0.04% | 10 |
| 6 | 290 | 7.7 | 0.31% | 4 |
| 7 | 194 | 6.5 | 0.22% | 2 |

*Measured according to the standard ASTM D1778.

Example 2

This example compares, for different filter media, the effects of a ratio of a value of a basis weight over air permeability of a first layer to a value of a basis weight over air permeability of a second layer and shows the resulting composite air permeability for the filter media. Samples were prepared as listed in Table 7:

TABLE 7

| Filter Media | Total Basis Weight (first and second layers), g/m$^2$ | Composite Air perm, CFM |
|---|---|---|
| 1 | 67 | 384 |
| 2 | 65 | 350 |
| 3 | 68 | 278 |
| 4 | 66 | 201 |
| 5 | 81 | 207 |
| 6 | 65 | 280 |
| 7 | 80 | 72 |
| 8 | 88 | 64 |
| 9 | 98 | 57 |
| 10 | 108 | 83 |

A first layer comprising a plurality of meltblown fibers (having a range of fiber diameters between 1 and 8 microns) was hand laid on a second, charged layer comprising 50 wt % dry spun acrylic and 50 wt % polypropylene polymer fibers, along with a support layer having an air permeability of greater than 1100 CFM. The first layer had a basis weight of less than 20 g/m$^2$ and the second layer had a basis weight between 30 g/m$^2$ and 85 g/m$^2$. All three layers of filter media 1-6 were needled together in a single step, with a needle density of at least 10 needle punches per square inch. Filter media 7-10 were not needled together. The composite air permeability values listed in Table 7 for media 7-10 are the equivalent composite air permeability values for each filter media if media 7-10 were needled. The composite air permeability values for media 7-10 were calculated by first measuring the composite air permeability of the unneedled filter media, and then increasing the unneedled composite air permeability value by a calibration factor (in percent) derived from reference needled filter media of varying air permeabilities and basis weights.

Filter media 1-10 did not include any adhesive nor any coating of a fluorinated species.

Each of filter media 1-6 had a final E1 efficiency of greater than 36%, an initial resistance of less than 3 mm H$_2$O, and a composite air permeability of greater than 200 CFM. Each of filter media 7-10 had a final E1 efficiency of greater than 36%, an initial resistance of greater than 5 mm H$_2$O, and a composite air permeability of less than 200 CFM. Testing for E1 final efficiency of the filter media was performed according to the ASHRAE 52.2 standard described herein.

Figure 7:
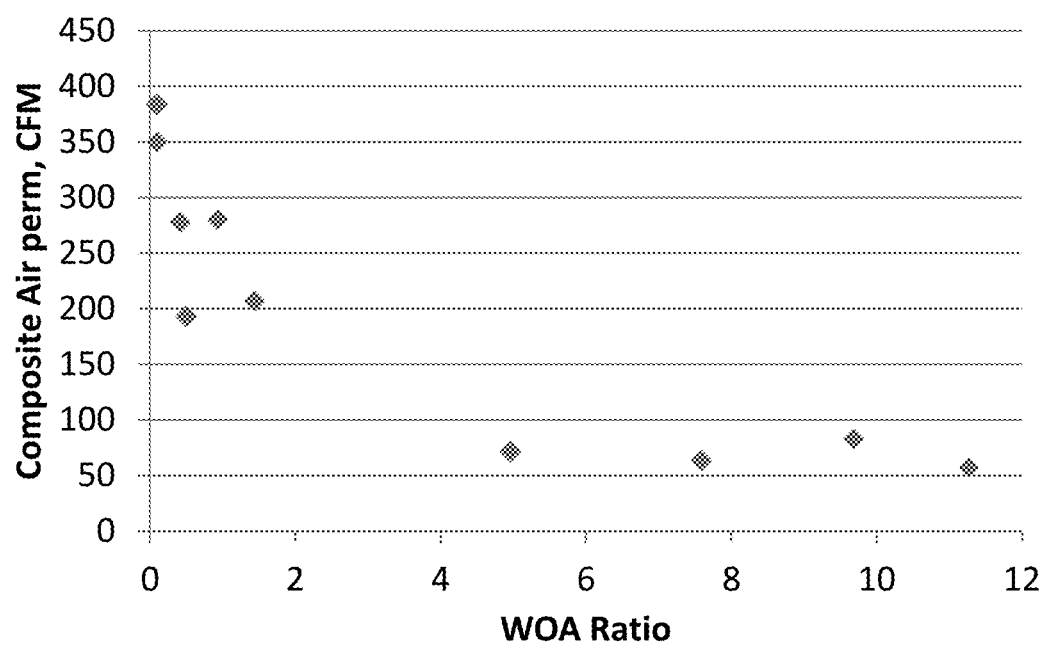
FIG. 7 is a plot of air permeability versus basis weight over air permeability ratio of a filter media, according to one set of embodiments.

FIG. 7 shows, for filter media 1-10, the air permeability of the filter media versus the ratio of the value of basis weight over air permeability of the first layer to the value of basis weight over air permeability of the second layer.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in some embodiments, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in some embodiments, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The term "alkane" is given its ordinary meaning in the art and refers to a saturated hydrocarbon molecule.

The term "amine" is given its ordinary meaning in the art and refers to a primary ($-NH_2$), secondary ($-NHR_x$), tertiary ($-NR_xR_y$), or quaternary ($-N^+R_xR_yR_z$) amine (e.g., where $R_x$, $R_y$, and $R_z$ are independently an aliphatic, alicyclic, alkyl, aryl, or other moieties, as defined herein).

What is claimed is:

1. A filter media, comprising:
   a first layer comprising a plurality of fibers;
   a second layer; and
   a support layer having an air permeability greater than 2000 CFM, the support layer needled to the first layer and the second layer,
   wherein the first layer has a first value of a basis weight in $g/m^2$ over an air permeability in CFM of the first layer,
   wherein the second layer has a second value of a basis weight in $g/m^2$ over an air permeability in CFM of the second layer,
   wherein the ratio of the first value to the second value is greater than or equal to 0.01 and less than or equal to 5,
   wherein the basis weight of the first layer is less than or equal to 20 $g/m^2$,
   wherein the plurality of fibers of the first layer have an average fiber diameter of greater than or equal to 1 micron and less than or equal to 8 microns,
   wherein the second layer is charged,
   wherein the air permeability of the first layer is greater than or equal to 200 CFM and less than or equal to 650 CFM, and
   wherein the basis weight of the second layer is greater than or equal to 30 $g/m^2$ and less than or equal to 85 $g/m^2$.

2. A filter media as in claim 1, wherein the second layer has an air permeability of greater than or equal to 330 CFM and less than or equal to 1000 CFM.

3. A filter media as in claim 1, wherein the support layer has an air permeability of greater than or equal to 2500 CFM and less than or equal to 10000 CFM.

4. A filter media as in claim 1, wherein the filter media has a final E1 efficiency of greater than or equal to 36%.

5. A filter media as in claim 1, wherein the filter media has an initial resistance of less than or equal to 1.6 mm $H_2O$.

6. A filter media as in claim 1, wherein the filter media is substantially free of adhesive.

7. A filter media as in claim 1, wherein the first layer comprises two or more sublayers.

8. A filter media as in claim 1, wherein the second layer comprises two or more sublayers.

9. A filter media as in claim 1, wherein the second layer comprises a first plurality of fibers comprising a first polymer and a second plurality of fibers comprising a second polymer.

10. A filter media as in claim 9, wherein the first polymer comprises acrylic.

11. A filter media as in claim 9, wherein the first plurality of fibers comprise dry spun acrylic fibers, mod-acrylic fibers, wet spun acrylic fibers, or combinations thereof.

12. A filter media as in claim 9, wherein the second polymer comprises polypropylene.

13. A filter media as in claim 9, wherein the first polymer comprises dry spun acrylic and the second polymer comprises polypropylene.

14. A filter media as in claim 1, wherein the first layer is a non-wet laid layer.

15. A filter media as in claim 1, wherein the first layer comprises a plurality of meltblown fibers, meltspun fibers, melt electrospun fibers, solvent electrospun fibers, centrifugal spun fibers, spunbond fibers, and/or combinations thereof.

16. A filter element comprising the filter media as in claim 1.

17. An HVAC filter comprising the filter element as in claim 16.

18. A filter element as in claim 16, wherein the second layer is positioned upstream relative to the first layer.

19. A filter element as in claim 16, wherein the first layer is positioned upstream relative to the second layer.

20. A filter element as in claim 16, wherein the ratio of the first value to the second value is greater than or equal to 0.01 and less than or equal to 4.

21. A filter element as in claim 16,
wherein the second layer comprises a first plurality of fibers comprising a first polymer and a second plurality of fibers comprising a second polymer, and
wherein a difference in dielectric constants between the first polymer and the second polymer is greater than or equal to 0.8 and less than or equal to 8.

* * * * *